(12) United States Patent
Higgins et al.

(10) Patent No.: US 10,209,079 B2
(45) Date of Patent: Feb. 19, 2019

(54) OPTIMIZATION OF MAP VIEWS BASED ON REAL-TIME DATA

(75) Inventors: Christopher Higgins, Portland, OR (US); Marc E. Davis, San Francisco, CA (US); Ronald Martinez, San Francisco, CA (US); Joseph O'Sullivan, Oakland, CA (US); Christopher Paretti, San Francisco, CA (US); Athellina Athsani, San Jose, CA (US); Chris Kalaboukis, San Jose, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1562 days.

(21) Appl. No.: 12/352,753

(22) Filed: Jan. 13, 2009

(65) Prior Publication Data

US 2010/0179756 A1   Jul. 15, 2010

(51) Int. Cl.
*G01C 21/34* (2006.01)
*G01C 21/20* (2006.01)
*G01C 21/36* (2006.01)

(52) U.S. Cl.
CPC ......... *G01C 21/20* (2013.01); *G01C 21/3484* (2013.01); *G01C 21/3641* (2013.01)

(58) Field of Classification Search
CPC . G06F 17/30867; H04L 67/306; H04L 67/18; H04L 67/20; H04L 67/22; H04L 67/42; H04N 7/17318; H04W 4/02; H04W 4/18; G01C 21/00; G01C 21/343; G01C 21/3484; G01C 21/3667; G01C 21/3679; G01C 21/34; G01C 21/3676; G06Q 30/0266; G06Q 50/01; G06Q 10/02; G06Q 30/02; G06Q 30/0255; G06Q 30/0261
USPC ................................. 701/210, 423
See application file for complete search history.

(56) References Cited

U.S. PATENT DOCUMENTS

| | | | | |
|---|---|---|---|---|
| 5,948,040 | A  * | 9/1999 | DeLorme | G01C 21/36 340/990 |
| 6,374,182 | B2 * | 4/2002 | Bechtolsheim et al. | 701/209 |
| 6,415,224 | B1 * | 7/2002 | Wako | G01C 21/3611 340/903 |
| 6,898,516 | B2 * | 5/2005 | Pechatnikov et al. | 701/202 |
| 7,522,997 | B2 * | 4/2009 | Asahara | G01C 21/3415 340/905 |
| 8,000,726 | B2 * | 8/2011 | Altman et al. | 455/456.3 |

(Continued)

*Primary Examiner* — Florian M Zeender
*Assistant Examiner* — Milena Racic
(74) *Attorney, Agent, or Firm* — James J. DeCarlo; Greenberg Traurig, LLP

(57) ABSTRACT

Routing information (e.g., routing information displayed in an electronic map or provided as verbal travel directions) is generated and presented to a user in a tailored manner. A request for routing information is received from a user. Spatial data, temporal data, social data, or topical data is retrieved that is related to the user and/or to a location or change of location of the user. Based on the retrieved data and the routing information, information display data is generated, and is provided to an electronic device of the user to generate an information display. An attribute of the information display is configured/modified based on the location information and/or on the spatial data, temporal data, social data, and/or topical data. For example, a display attribute and/or an audio attribute of the information display may be modified.

19 Claims, 22 Drawing Sheets

(56) References Cited

U.S. PATENT DOCUMENTS

| | | | |
|---|---|---|---|
| 2003/0151592 A1* | 8/2003 | Ritter | G01C 21/3638 345/156 |
| 2004/0236507 A1* | 11/2004 | Maruyama | G01C 21/3626 701/437 |
| 2007/0281689 A1* | 12/2007 | Altman et al. | 455/435.1 |
| 2007/0293958 A1* | 12/2007 | Stehle | G06Q 10/04 700/30 |
| 2008/0140309 A1* | 6/2008 | Jendbro | G01C 21/3614 701/533 |
| 2008/0153537 A1* | 6/2008 | Khawand | H03G 3/32 455/550.1 |
| 2008/0170679 A1* | 7/2008 | Sheha et al. | 379/201.06 |
| 2008/0253757 A1* | 10/2008 | Bells | G03B 17/00 396/77 |
| 2008/0288333 A1* | 11/2008 | Keaveny | G01C 21/30 340/994 |
| 2008/0294330 A1* | 11/2008 | Sasano | G01C 21/3415 701/117 |
| 2009/0125228 A1* | 5/2009 | Dicke | G01C 21/20 701/533 |
| 2009/0281719 A1* | 11/2009 | Jakobson | 701/201 |

* cited by examiner

OPTIMIZATION OF MAP VIEWS BASED ON REAL-TIME DATA

BACKGROUND OF THE INVENTION

Field of the Invention

The present invention relates to the viewing of maps on electronic devices.

Background Art

To efficiently travel from one geographic location to another, it generally is beneficial to have directions. A number of interactive Internet-based mapping portals are available to generate such directions, including Yahoo!® Maps, MapQuest, and Google™ Maps. An electronic device (e.g., a desktop computer, a handheld computer, etc.) may be used to access a mapping portal. To use a mapping portal to generate travel directions, a user typically submits a start location and a finish location (e.g., in the form of a business name, mailing address, etc.). The mapping portal processes the start location and finish location, and generates a map with travel directions from the start location to the finish location overlaid thereupon. The travel directions may be followed by the user to travel from the start location to the finish location.

In addition to travel directions, a variety of further types of information may be generated when people interact with electronic devices. Such information includes information regarding applications used, social network information, physical and online locations visited, etc. However, most of this information is effectively abandoned due to deficiencies in the way such information can be captured. For example, and with respect to a mobile phone, information is generally not gathered while the mobile phone is idle (i.e., not being used by a user). Other information, such as a presence of others in the immediate vicinity, a time and/or frequency of messages to other users, and activities of a user's social network are also not captured effectively.

Techniques have not been developed for effectively using such information to enhance the lives and routines of users, including by enhancing the presentation of travel directions by electronic devices. What is desired are ways of enhancing the presentation of travel directions by electronic devices based on information generated when people use electronic devices.

BRIEF SUMMARY OF THE INVENTION

Routing information, such as routing information displayed in maps or travel directions provided in an audio manner, is generated and presented in a tailored manner to users. For example, visual routing information may be generated and presented to a user. A display attribute of the visual routing information, such as a display area, a degree of zoom, a field of view, a refresh rate, or an amount of sponsored content, may be tailored according to the interests, relationships, and/or other information related to the user. In another example, audio routing information (e.g., automated verbal driving directions) may be generated and presented to a user. An audio attribute of the audio routing information, such as a volume or a rate of speech, may be tailored according to the interests, relationships, and/or other information related to the user.

In one implementation, a routing engine is provided. The routing engine includes an information display generator and a related data retriever. The information display generator is configured to receive first information that includes an identification of a user and an indication of a first location associated with the user, to generate information display data that indicates the first location associated with the user. The related data retriever is configured to retrieve at least one of spatial data, temporal data, social data, or topical data related to at least one of the user and the first location. The information display generator is configured to modify the information display data to modify an attribute of an information display corresponding to the information display data based on at least one of the first location or the retrieved at least one of the spatial data, temporal data, social data, or topical data.

For instance, the information display generator may modify a display attribute such as a display area, a degree of zoom, a field of view, a refresh rate, an amount of sponsored content, and/or other display attribute of the information display, and/or an audio attribute such as a volume, a rate of speech, and/or other audio attribute of the information display.

The information display generator may be configured to determine a rate of the change of location associated with the user and/or a mode of transportation of the user, and to modify one or more attributes of the information display based thereon.

The routing engine may include a routing determiner. The routing determiner may be configured to receive the first information that includes the identification of the user, the indication of the first location associated with the user, and an indication of a destination location, and to determine a route between the first location and the destination location. The information display generator may be configured to indicate the determined route in the generated information display data.

The information display generator may be configured to determine a modification to a determined route and/or to determine a second route based at least on at least one of the first location, a change of location, or the retrieved at least one of the spatial data, temporal data, social data, or topical data. The routing determiner may be configured to generate route data representative of the determined route modification and/or the second route, and the information display generator may be configured to indicate the determined route modification and/or the second route in the generated information display data.

In another implementation, the information display generator is configured to receive first information that includes an identification of a user and an indication of a first location associated with the user, to generate information display data that indicates the first location associated with the user, and to receive second information that includes the identification of the user and an indication of a change of location associated with the user. The related data retriever is configured to retrieve at least one of spatial data, temporal data, social data, or topical data related to at least one of the user and the change of location. The information display generator is configured to modify the information display data to modify an attribute of an information display corresponding to the information display data based on at least one of the change of location or the retrieved at least one of the spatial data, temporal data, social data, or topical data.

In another implementation, a method for presenting routing information is provided. First information is received that includes an identification of a user and an indication of a first location associated with the user. First information display data representative of a first information display is generated that indicates the first location associated with the user. The first information display data is provided to enable the first information display to be displayed to the user.

Second information is received that includes the identification of the user and an indication of a change of location associated with the user. At least one of spatial data, temporal data, social data, or topical data related to at least one of the user and the change of location is received. Second information display data representative of a second information display is generated that includes an information display attribute modified relative to the first information display based on at least one of the change of location or the received at least one of the spatial data, temporal data, social data, or topical data. The second information display data is provided to enable the second information display to be displayed to the user.

Computer program products are also described herein. The computer program products include a computer-readable medium having computer program logic recorded thereon for enabling routing information to be generated and/or to be presented in a tailored manner, according to the implementations described herein.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
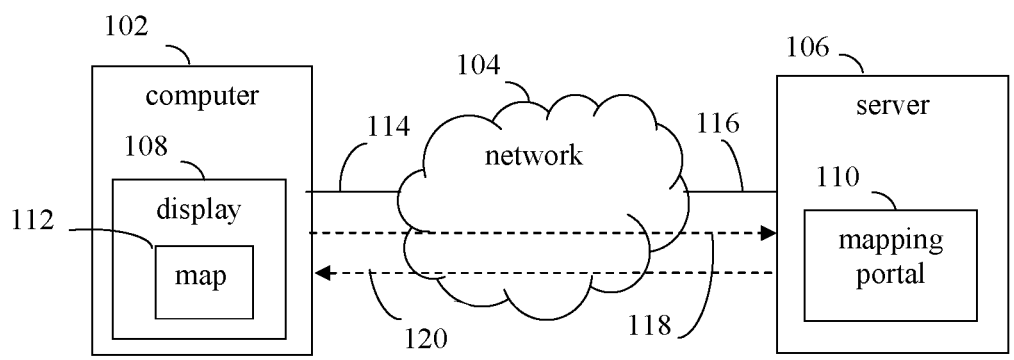
FIG. 1 shows a block diagram of an example map generating system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention relate to travel routing tools, such as Internet-based mapping portals. FIG. 1 shows an example network-based map generating system 100. Map generating system 100 includes a computer 102, a network 104, and a server 106. Computer 102 has a display 108. A mapping portal 110 resides on server 106. Mapping portal 110 is a map generating tool that may be used to generate a map of a region, and that may generate travel directions for display on the map. Mapping portal 110 may be one of a number of available interactive Internet-based mapping portals, such as Yahoo!® Maps, MapQuest, and Google™ Maps.

To generate travel directions using mapping portal 110, a user typically enters a start location (e.g., in the form of an address, a city, a zip code, etc.) and a destination location into an interface (e.g., a web browser) at computer 102. Computer 102 transmits the entered start and destination location information in a first communication signal 118 through network 104 to server 106. Mapping portal 110 in server 106 receives and processes the start location and destination location information, and generates map data, which may include mapping information regarding the start and destination locations, and information for traveling from the start location to the destination location. Server 102 transmits the map data in a second communication signal 120 through network 104 to computer 102. Display 108 of computer 102 displays a map 112 based on the map data contained in second communication signal 120. Map 112 shows the start and destination locations, and also shows travel directions between the start and destination locations.

While map 112 generated by mapping portal 110 shows a route of interest to the user, mapping portal 110 does not generate map 112 in a manner that is otherwise tailored to the user. For example, map 112 is not displayed having a size, a degree of zoom, a field of view, or other attribute that is tailored to the interests, relationships, and/or other information associated with the user.

Embodiments of the present invention overcome the deficiencies of conventional mapping portals by enabling routing information, such as routing information displayed on maps, to be generated and displayed in a manner that is tailored to users. Example embodiments of the present invention are described in detail in the following section.

II. Example Embodiments for the Presentation of Tailored Routing Information

Example embodiments are described for generating and presenting routing information, such as routing information displayed in maps or by audio, in a manner that is tailored to the users. For example, visual routing information may be displayed to a user in a map having a display area, a degree of zoom, a field of view, and/or other display attribute that is tailored to the interests, relationships, and/or other information related to the user. In another example, audio routing information (e.g., verbal driving directions) may be provided to the user having a volume, a rate of speech, and/or other audio attribute that is tailored to the interests, relationships, and/or other information related to the user. The example embodiments described herein are provided for illustrative purposes, and are not limiting. Further structural and operational embodiments, including modifications/alterations, will become apparent to persons skilled in the relevant art(s) from the teachings herein.

Figure 2:
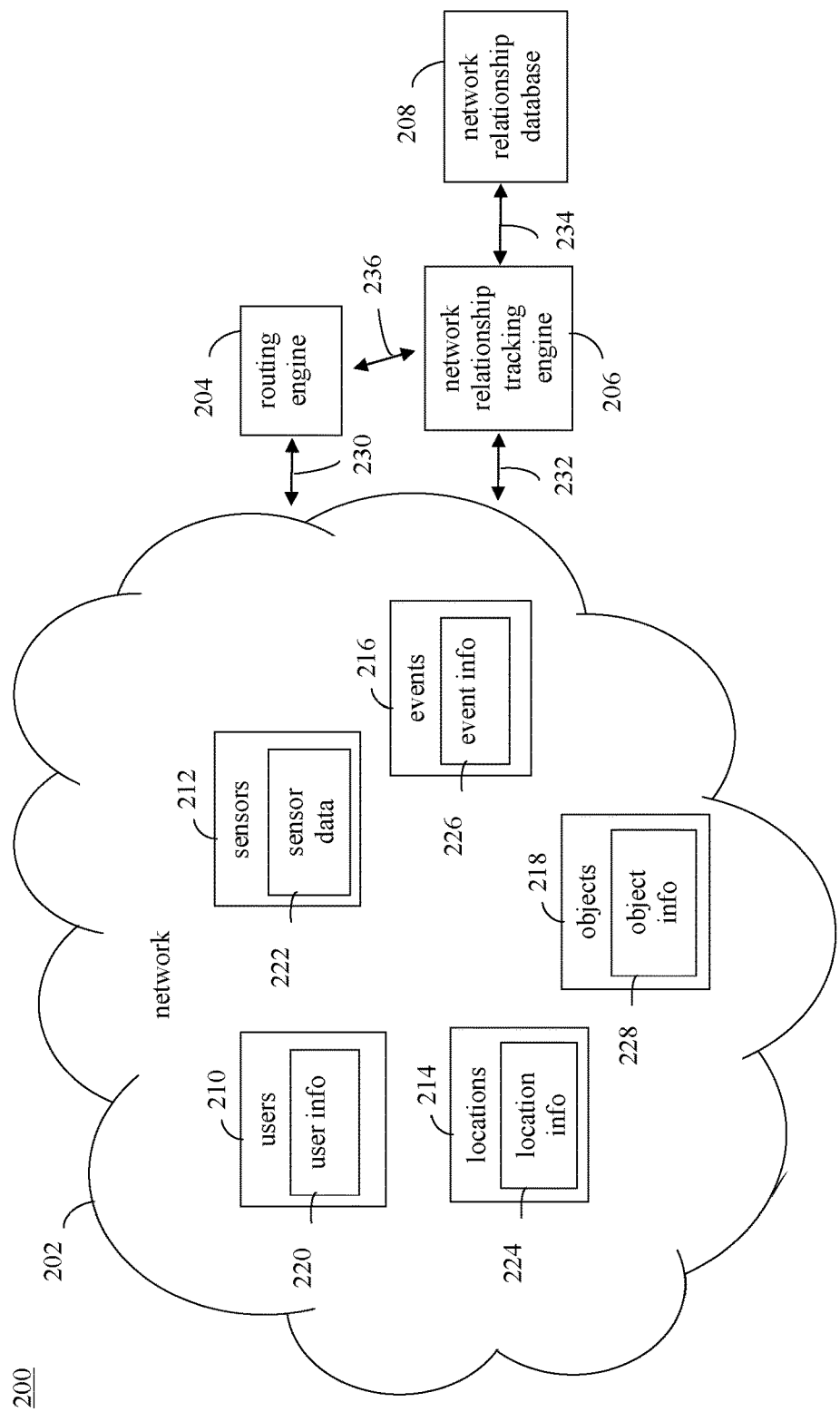
FIG. 2 shows a block diagram of a routing generation and world relationship system, according to an example embodiment of the present invention.

Embodiments of the present invention enable routing information to be provided to users in a manner that is tailored to the users. For example, the display of routing information may be configured based on world relationships. To provide enhanced routing information to users, embodiments leverage relationships (e.g., associations, interactions, etc.) between places, events, topics, and/or users. For instance, FIG. 2 shows a block diagram of a routing generation and world relationship system 200, according to an example embodiment of the present invention. As shown in FIG. 2, routing generation and world relationship system 200 includes a network 202, a routing engine 204, a network relationship tracking engine 206, and a network relationship database 208. Routing engine 204 is communicatively coupled to network 202 by a first communication link 230, network relationship tracking engine 206 is communicatively coupled to network 202 by a second communication link 232, and routing engine 204 is communicatively coupled to network relationship tracking engine 206 by a third communication link 236. Either one or both of communication links 232 and 236 may be present. Network relationship tracking engine 206 is communicatively coupled with network relationship database 208 by a fourth communication link 234. Each of the elements of system 200 is described in detail below. Further description of the elements of system 200 is provided in subsequent sections.

As shown in FIG. 2, routing engine 204 and network relationship tracking engine 206 may communicate with each other through first and second communication links 234 and 232 and network 202, or through third communication link 236 (when present). First, second, third, and fourth communication links 230, 232, 236, and 234 may include any type and/or combination of communication links, including wired and/or wireless links, such as IEEE 802.11 wireless LAN (WLAN) wireless links, Ethernet links, USB links, etc. In an embodiment, routing engine 204 and network relationship tracking engine 206 may each include one or more network interfaces, including wired or wireless interfaces, such as an as IEEE 802.11 wireless LAN (WLAN) wireless interface, an Ethernet interface, a USB interface, etc.

Network 202 is an online network or a combination of networks, that includes a community of users 210 (network participating persons). As shown in FIG. 2, network 202 includes users 210, sensors 212, locations 214, events 216, and objects 218. Network 202 may include any number of users 210, including hundreds, thousands, or even millions of user 210. Users 210 may interact with each other in network 202 using corresponding electronic devices (e.g., computers, cell phones, etc.), as described in detail further below. Network 202 includes a communications network, such as a local area network (LAN), a wide area network (WAN), or a combination of networks, such as the Internet. For example, network 202 may overlap with the World Wide Web. The communication network enables communications between users 210 and other entities of network 202.

Network 202 may enable one or more ways for users 210 to interact, including enabling communications between users 210 through one or more of telephone communications (e.g., cell phone, landline, etc.), email, blogging, discussion groups, file sharing, instant messaging, online chat, video, voice chat, and/or other user communication mechanisms. As shown in FIG. 2, each user 210 has corresponding user information 220. User information 220 may include any information about the respective user 210 that the user may desire to make accessible to other users 210 of network 202. For example, user information 220 may include a name and/or an alias, a representative image (e.g., a photographic image and/or avatar), contact information, status information, a list of interests (e.g., preferred and disliked locations 214, objects 218, events 216), images, videos, audio recordings, and/or other information regarding the respective user 210. In an embodiment, user information 220 may include a list of friends, disliked people, family, professional contacts, and other persons associated with the user, including others of users 210. Examples of users 210 are described in further detail below.

Network 202 may include any number of sensors 212, including hundreds, thousands, or even millions of sensors 212. Sensors 212 are configured to monitor, track, and/or otherwise sense other entities in network 202, including users 210, locations 214, events 216, and objects 218. Sensors 212 generate sensor data 222, which includes information collected by sensors 212 regarding users 210, locations 214, events 216, and objects 218, and that is accessible in network 202. Examples of sensors 212 are described in further detail below.

Network 202 may include any number of locations 214, including hundreds, thousands, or even millions of locations 214. Locations 214 includes physical and/or virtual locations in network 202, including locations of buildings, homes, restaurants, businesses, monuments, people, etc. Each of locations 214 may have associated location information 224 descriptive of the corresponding location 214 that is accessible in network 202. Examples of locations 214 are described in further detail below.

Network 202 may include any number of events 216, including hundreds, thousands, or even millions of events 216. Events 216 includes events that occur in network 202. Each of events 216 may have associated event information 226 descriptive of the corresponding event 216 that is accessible in network 202. Examples of events 216 are described in further detail below.

Network 202 may include any number of objects 218, including hundreds, thousands, or even millions of objects 218. Each of objects 218 may have associated object information 228 descriptive of the corresponding object 218 that is accessible in network 202. Examples of objects 218 are described in further detail below.

Routing engine 204 is a routing generator that may be used to generate routing information for requesting users, such as one or more of users 210, to be displayed on a map, to be provided as audio directions, and/or to be provided in any other manner (e.g., through a haptic interface). For example, routing engine 204 may include mapping portal 110 described above with respect to FIG. 1. Examples of routing engine 204 are described in further detail below.

Network relationship tracking engine 206 is configured to collect information from network 202. For example, network relationship tracking engine 206 may collect user information 220 from users 210, sensor data 222 from sensors 212, event information 226 associated with events 216, location information 224 associated with locations 214, and/or object information 228 associated with objects 218. For example, sensor data 222 may include "sensed" information regarding users 210, locations 214, events 216, and/or objects 218. Network relationship tracking engine 206 stores the collected information in network relationship database 208.

In one example embodiment, routing engine 204 is configured to transmit a request for collected network information from network relationship tracking engine 206 that relates to a user and/or routing information generated by routing engine 204 for the user. Network relationship engine 206 is configured to access network relationship database 208 for the information, and to transmit the information to routing engine 204.

Routing engine 204 is configured to generate and process routing information according to the network information received from network relationship tracking engine 204. Routing engine 204 may modify one or more attributes of the routing information based on the received network information. For example, routing engine 204 may modify a display area, a degree of zoom, a field of view, a refresh rate, a brightness, a color scheme, and amount of display space allocated to sponsored content, and/or other attribute of visual routing information based on the received network information. In another example, routing engine 204 may modify a volume, a rate of speech, and/or other attribute of audio routing information based on the received network information. Routing engine 204 transmits the processed routing information to the requesting user, where the processed routing information is provided to the user. The processed routing information is provided to the user with a modified attribute, such as a modified display area, a modified degree of zoom, a modified field of view, a modified refresh rate, a modified brightness, a modified color scheme, a modified volume, a modified rate of speech, and/or other modified attribute. In this manner, routing information is provided to a user in a tailored manner.

Example embodiments for routing generation and world relationship network system 200, and the elements thereof, are described in the following subsections. The following subsection describes example embodiments for network 202 and network relationship tracking engine 206. The subsequent subsection describes examples of user information 220, followed by a subsection describing example embodiments for routing engine 204, which is followed by a subsection describing example operation of embodiments of routing generation and world relationship network system 200.

A. Example World Network and Network Relationship Tracking Engine Embodiments Network 202 and network relationship tracking engine 206 shown in FIG. 2 may be implemented in a variety of ways. In an embodiment, network 202 and network relationship tracking engine 206 may comprise a "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built are first introduced, real-world entities and information objects. These distinctions are made in order to enable correlations to be made from which relationships between electronic/logical objects and real objects can be determined. A real-world entity (RWE) refers to a person, device, location, or other physical thing known to the W4 COMN (e.g., users 210, sensors 212, locations 214, and objects 218 shown in FIG. 2). Each RWE known to the W4 COMN may be assigned or otherwise provided with a unique W4 identification number that absolutely identifies the RWE within the W4 COMN.

RWEs can interact with the network directly or through proxies, which can themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that can be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations cannot be considered separately from the physical device.

Examples of RWEs that typically use proxies to interact with W4 COMN network include non-electronic entities including physical entities, such as people (e.g., users 210), locations (e.g., locations 214) (e.g., states, cities, houses, buildings, airports, roads, etc.) and things (e.g., objects 218) (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs can create or consume data (often by creating or consuming IOs) during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO! MAIL by YAHOO!), a calendar application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

An IO in the W4 COMN can be provided a unique W4 identification number that absolutely identifies the IO within the W4 COMN. Although data in an IO can be revised by the act of an RWE, the IO remains a passive, logical data representation or data source and, thus, is not an RWE.

For every IO there are at least three classes of associated RWEs. The first is the RWE who owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor (e.g., sensors 212). "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

Figure 3:
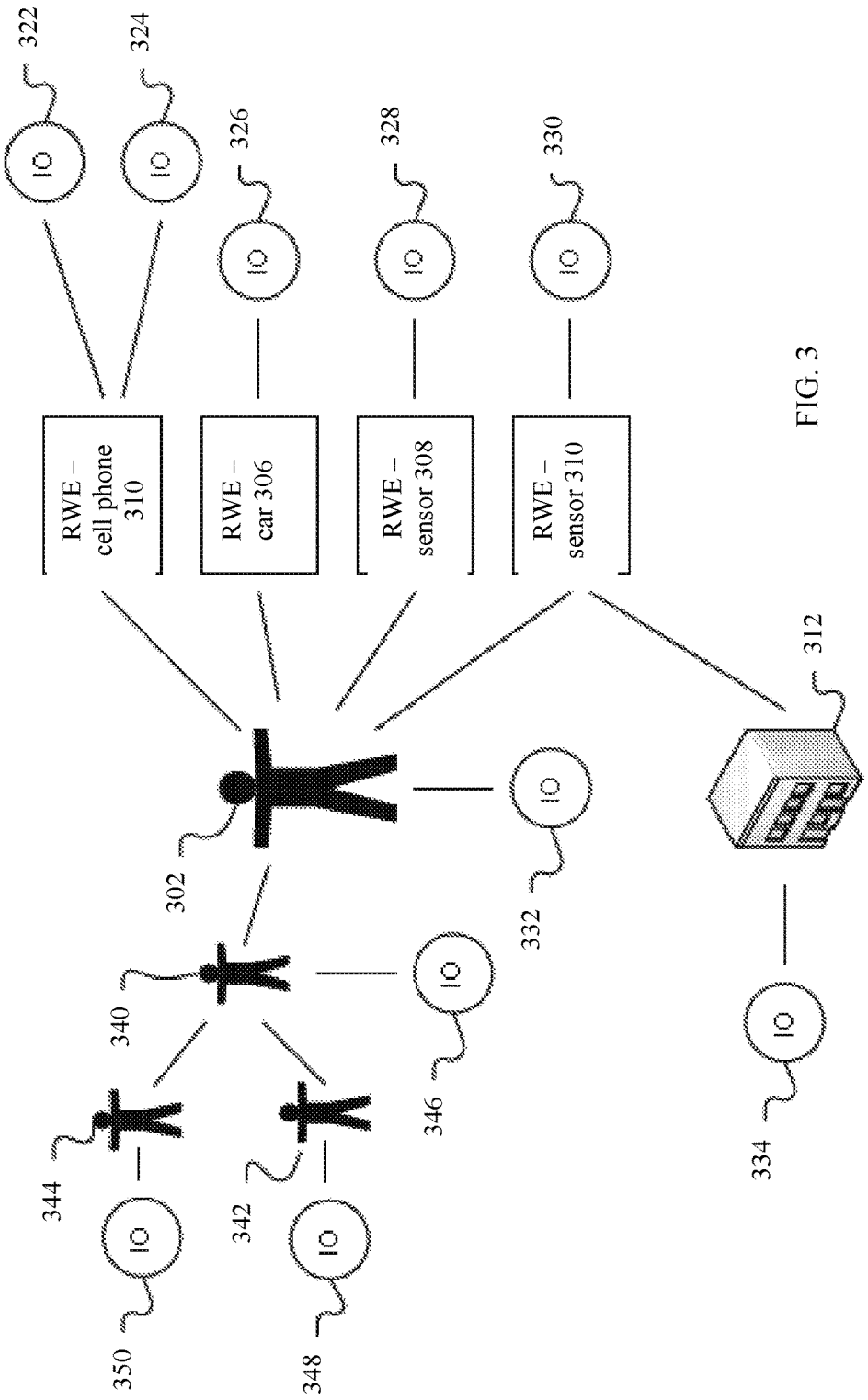
FIG. 3 illustrates an example of the relationships between RWEs (real world entities) and IOs (information objects) on a W4 (Who, What, When and Where) COMN (communication network).

FIG. 3 illustrates an example of the relationships between RWEs and IOs on the W4 COMN. In the embodiment illustrated in FIG. 3, a user 302 is a RWE of the network provided with a unique network ID. User 302 is a human that communicates with the network via proxy devices 304, 306, 308, 310 associated with the user 302, all of which are RWEs of the network and provided with their own unique network ID. Some of these proxies can communicate directly with the W4 COMN or can communicate with the W4 COMN via IOs such as applications executed on or by the device.

As mentioned above, proxy devices 304, 306, 308, 310 can be explicitly associated with user 302. For example, device 304 can be a smart phone connected by a cellular service provider to the network and another device 306 can be a smart vehicle that is connected to the network. Other devices can be implicitly associated with the user 302. For example, device 308 can be a "dumb" weather sensor at a location matching the current location of the user's cell phone 304, and thus implicitly associated with user 302 while RWEs 304, 308 are co-located. Another implicitly associated device 310 can be a sensor 310 for a physical location 312 known to the W4 COMN. Location 312 is known, either explicitly (through a user-designated relationship, e.g., this is my home, place of employment, parent, etc.) or implicitly (the user 302 is often co-located with the RWE 312 as evidenced by data from the sensor 310 at that location 312), to be associated with the first user 302.

User 302 can also be directly associated with other people, such as the person 340 shown, and then indirectly associated with other people 342, 344 through their associations as shown. Again, such associations can be explicit (e.g., the user 302 can have identified the associated person 340 as his/her father, or can have identified the person 340 as a member of the user's social network) or implicit (e.g., they share the same address).

Tracking the associations between people (and other RWEs as well) allows the creation of the concept of "intimacy." Intimacy is a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

Each RWE 302, 304, 306, 308, 310, 312, 340, 342, 344 of the W4 COMN can be associated with one or more IOs as shown. Continuing the examples discussed above, FIG. 3 illustrates two IOs 322, 324 as associated with the cell phone device 304. One IO 322 can be a passive data object such as an event record that is used by scheduling/calendaring software on the cell phone, a contact IO used by an address book application, a historical record of a transaction made using device 304 or a copy of a message sent from device 304. The other IO 324 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs 322, 324 can be locally stored on device 304 or stored remotely on some node or datastore accessible to the W4 COMN, such as a message server or cell phone service datacenter. IO 326 associated with vehicle 308 can be an electronic file containing the specifications and/or current status of vehicle 308, such as make, model, identification number, current location, current speed, current condition, current owner, etc. IO 328 associated with sensor 308 can identify the current state of the subject(s) monitored by sensor 308, such as current weather or current traffic. IO 330 associated with cell phone 310 can be information in a database identifying recent calls or the amount of charges on the current bill.

Furthermore, those RWEs which can only interact with the W4 COMN through proxies, such as people 302, 340, 342, 344, computing devices 304, 306 and location 312, can have one or more IOs 332, 334, 346, 348, 350 directly associated with them. An example includes IOs 332, 334 that contain contact and other RWE-specific information. For example, a person's IO 332, 346, 348, 350 can be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.). Another example of a person's IO 332, 346, 348, 350 includes remote applications through which a person can communicate with the W4 COMN such as an account with a web-based email service such as Yahoo! Mail. The location's IO 334 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file can include data identifying the artist, song, etc., album art, and the format of the music data. This metadata can be stored as part of the music file or in one or more different IOs that are associated with the music file or both. In addition, W4 metadata for the same music file can include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 4:
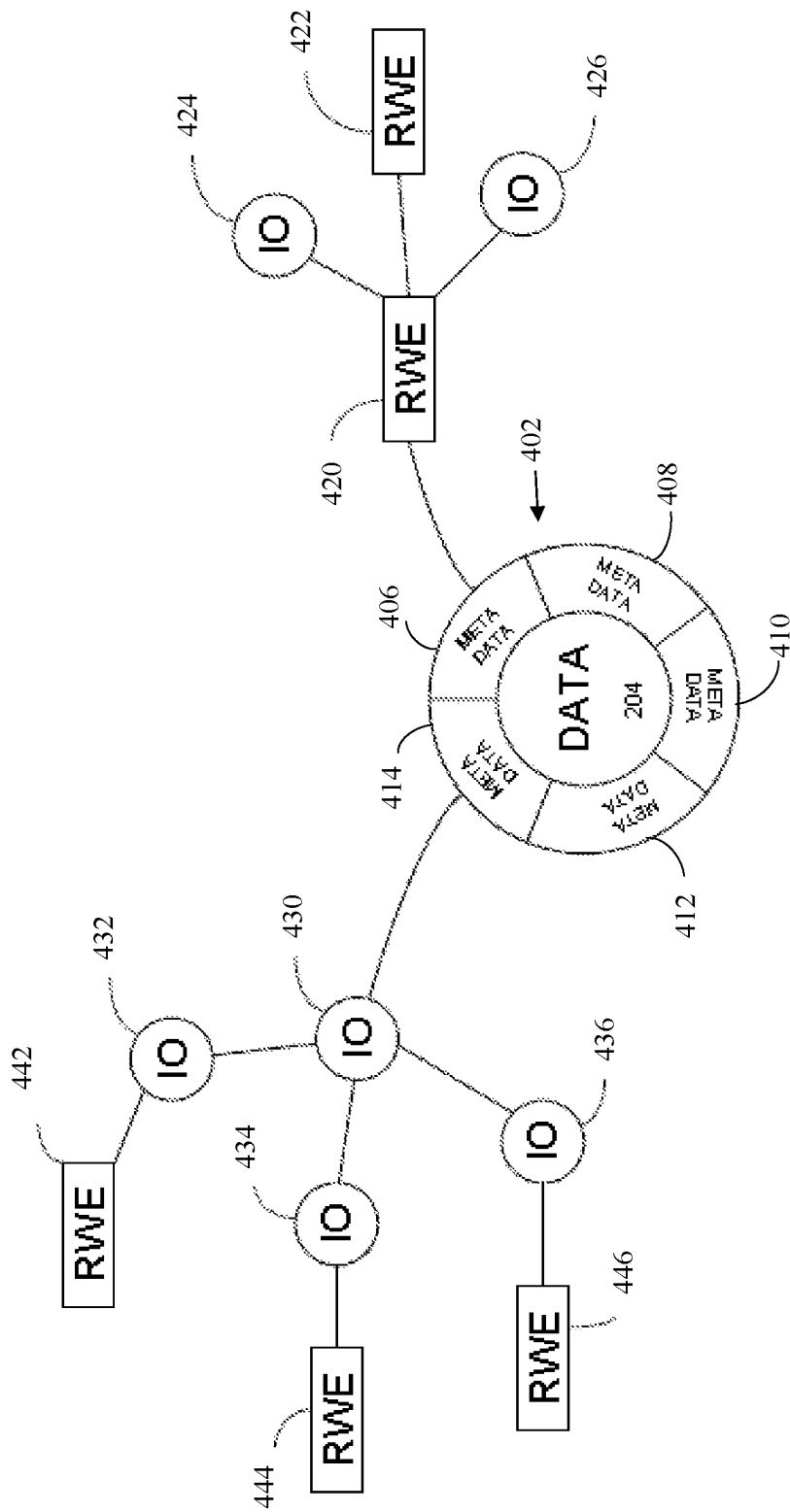
FIG. 4 illustrates an example of metadata defining the relationships between RWEs and IOs on the W4 COMN.

FIG. 4 illustrates an example of metadata defining the relationships between RWEs and IOs on the W4 COMN. In the embodiment shown, an IO 402 includes object data 404 and five discrete items of metadata 406, 408, 410, 412, 414. Some items of metadata 408, 410, 412 can contain information related only to the object data 404 and unrelated to any other IO or RWE. For example, a creation date, text or an image that is to be associated with object data 404 of IO 402.

Some of items of metadata 406, 414, on the other hand, can identify relationships between IO 402 and other RWEs and IOs. As illustrated, IO 402 is associated by one item of metadata 406 with an RWE 420 that RWE 420 is further associated with two IOs 424, 426 and a second RWE 422 based on some information known to the W4 COMN. This part of FIG. 4, for example, could describe the relations between a picture (IO 402) containing metadata 406 that identifies the electronic camera (the first RWE 420) and the user (the second RWE 424) that is known by the system to be the owner of the camera 420. Such ownership information can be determined, for example, from one or another of IOs 424, 426 associated with camera 420.

FIG. 4 also illustrates metadata 414 that associates IO 402 with another IO 430. This IO 430 is itself associated with three other IOs 432, 434, 436 that are further associated with different RWEs 442, 444, 446. This part of FIG. 4, for example, could describe the relations between a music file (IO 402) containing metadata 406 that identifies the digital rights file (first IO 430) that defines the scope of the rights of use associated with this music file 402. The other IOs 432, 434, 436 are other music files that are associated with the rights of use and which are currently associated with specific owners (RWEs 442, 444, 446).

Figure 5:
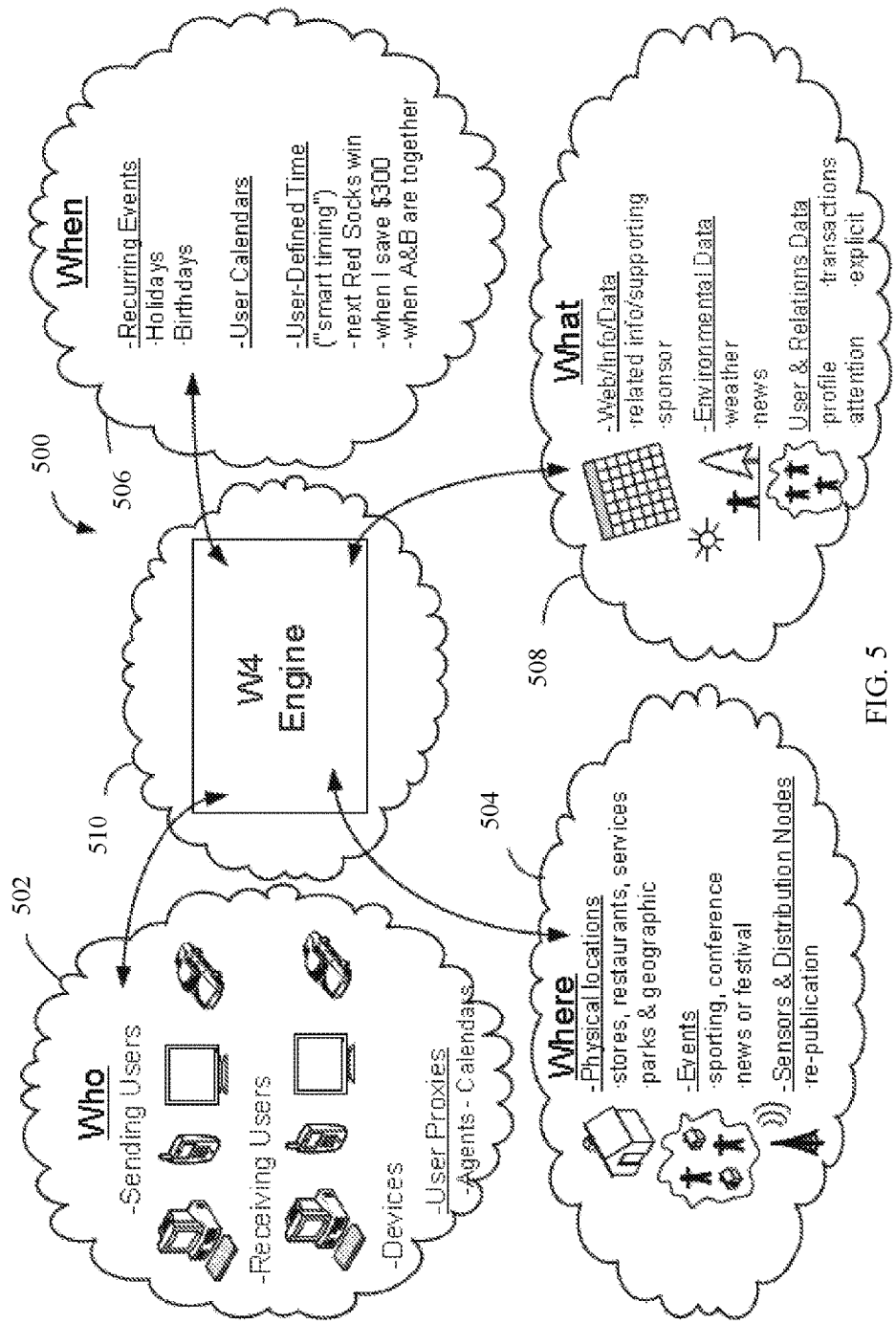
FIG. 5 illustrates a conceptual model of an example W4 COMN.

FIG. 5 illustrates an example conceptual model of the W4 COMN, shown in FIG. 5 as a W4 COMN 500. As shown in FIG. 5, W4 COMN 500 includes a Who Cloud 502, a Where cloud 504, a When cloud 506, a What cloud 508, and a W4 engine 510. W4 COMN 500 creates an instrumented messaging infrastructure in the form of a global logical network cloud conceptually sub-divided into networked-clouds for each of the 4Ws: Who (Who cloud 502), Where (Where cloud 504), What (What cloud 508), and When (When cloud 506). This global logical network cloud is an example of network 202 shown in FIG. 2. Who cloud 502 includes all users (e.g., users 210), whether acting as senders, receivers, data points or confirmation/certification sources as well as user proxies in the forms of user-program processes, devices, agents, calendars, etc. Where cloud 504 includes all physical locations, events (e.g., events 216), sensors (e.g., sensors 212) or other RWEs associated with a spatial reference point or location. When cloud 506 includes natural temporal events (e.g., events 216) (that is events that are not associated with particular location or person such as days, times, seasons) as well as collective user temporal events (holidays, anniversaries, elections, etc.) and user-defined temporal events (birthdays, smart-timing programs). What cloud 508 includes known data—web or private, commercial or user—accessible to the W4 COMN, including for example environmental data like weather and news, RWE-generated data, IOs and IO data, user data, models, processes and applications. Thus, conceptually, most data is contained in the What cloud 508.

As this is just a conceptual model, it should be noted that some entities, sensors or data will naturally exist in multiple clouds either disparate in time or simultaneously. Additionally, some IOs and RWEs can be composites in that they combine elements from one or more clouds. Such composites can be classified or not as appropriate to facilitate the determination of associations between RWEs and IOs. For example, an event consisting of a location and time could be equally classified within When cloud 506, What cloud 508 and/or Where cloud 504.

W4 engine 510 is an example of network relationship tracking engine 206 shown in FIG. 2. W4 engine 510 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). W4 engine 510 controls all interactions between each layer of the W4 COMN and is responsible for executing any approved user or application objective enabled by W4 COMN operations or interoperating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of W4 engine 510 is to collect data concerning all communications and interactions conducted via W4 COMN 500, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

W4 engine 510 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e., the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself, while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, W4 engine 510 represents a group of applications executing on one or more computing devices that are nodes of the W4 COMN. For the purposes of this disclosure, a computing device is a device that includes a processor and memory for storing data and executing software (e.g., applications) that perform the functions described. Computing devices can be provided with operating systems that allow the execution of software applications in order to manipulate data.

In the embodiment shown, W4 engine 510 can be one or a group of distributed computing devices, such as one or more general-purpose personal computers (PCs) or purpose built server computers, connected to the W4 COMN by suitable communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a mass storage device (not shown) that is connected to, or part of, any of the computing devices described herein including W4 engine 510. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media can comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 6:
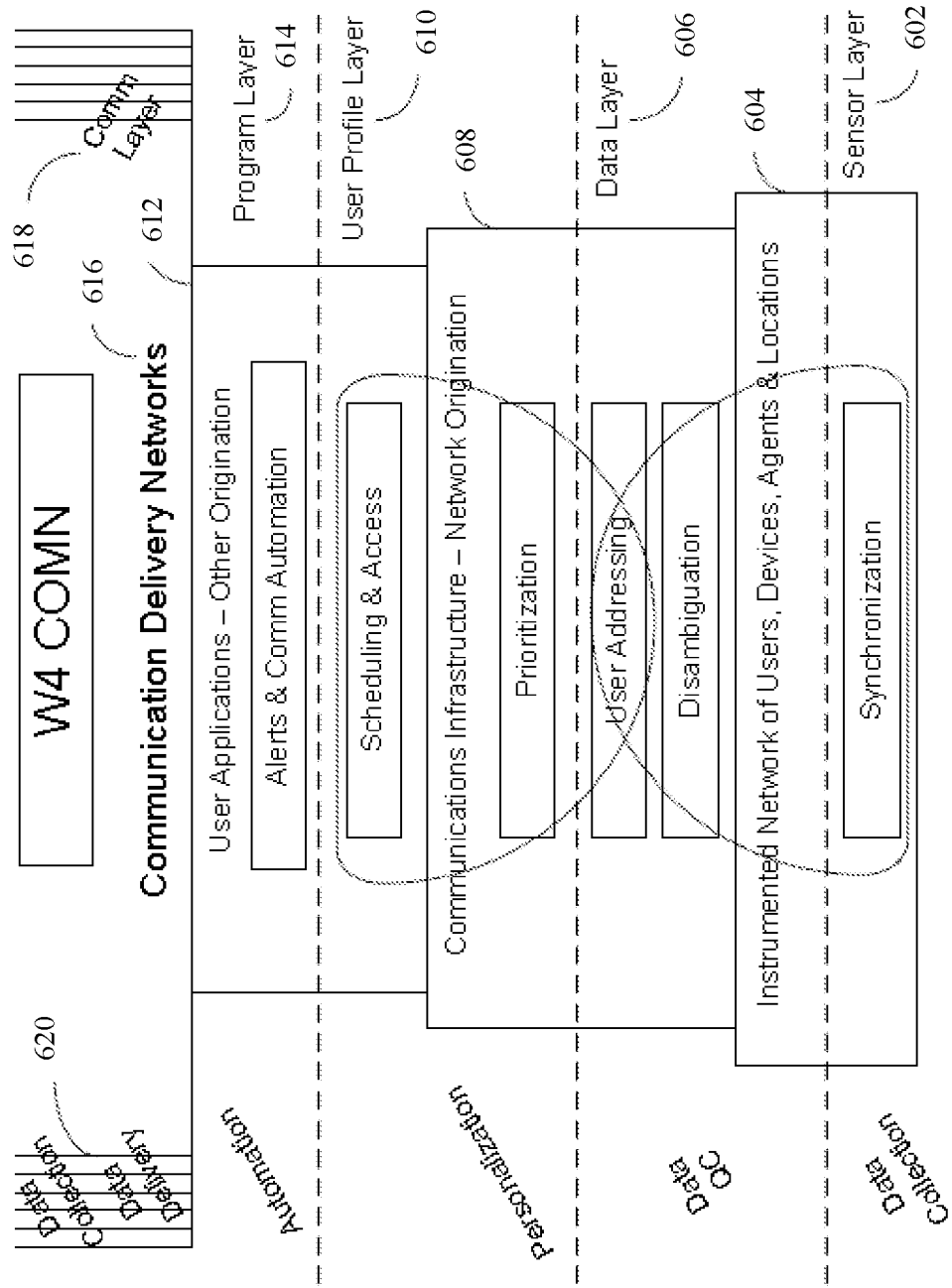
FIG. 6 illustrates functional layers of an example W4 COMN architecture.

FIG. 6 illustrates the functional layers of an example W4 COMN architecture. At the lowest layer, referred to as a sensor layer 602, is a network 604 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is a data layer 606 in which the data produced by sensor layer 602 is stored and cataloged. The data can be managed by either network 604 of sensors or a network infrastructure 608 that is built on top of the instrumented network of users, devices, agents, locations, processes and sensors. Network infrastructure 608 is the core under-the-covers network infrastructure that includes the hardware and software necessary to receive that transmit data from the sensors, devices, etc. of network 604. It further includes the processing and storage capability necessary to meaningfully categorize and track the data created by network 604.

The next layer of the W4 COMN is a user profiling layer 610. Layer 610 can further be distributed between network infrastructure 608 and user applications/processes 612 executing on the W4 engine or disparate user computing devices. User profiling layer 610 performs the W4 COMN's user profiling functions. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, user profiling layer 610 is a logic-based layer above all sensors to which sensor data are sent in the rawest form to be mapped and placed into a W4 COMN data backbone 620. The data (collected and refined, related and de-duplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from anything other than the network, e.g., RWEs such as users, locations, proxies and processes, come from program layer 614 of the W4 COMN. Some applications can be developed by the W4 COMN operator and appear to be implemented as part of network infrastructure 608, e.g. email or calendar programs because of how closely they operate with the sensor processing and user profiling layer 610. Applications 612 also serve some role as a sensor in that they, through their actions, generate data back to data layer 606 via the data backbone concerning any data created or available due to the applications execution.

Program layer 614 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices).

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of its regular intersection and sensing by enabled devices in its real-world location.

Above the program layer 614 (and sometimes hosted within it) is a communications delivery network(s) 616. This can be operated by the W4 COMN operator or be independent third-party carrier service, but in either case it functions to deliver the data via synchronous or asynchronous communication. Communication delivery network 616 sends or receives data (e.g., http or IP packets) on behalf of a specific application or network infrastructure 608 request.

Communication delivery layer 618 also has elements that act as sensors including W4 entity extraction from phone calls, emails, blogs, etc. as well as specific user commands within the delivery network context, e.g., "save and prioritize this call" said before end of call can trigger a recording of the previous conversation to be saved and for the W4 entities within the conversation to analyzed and increased in weighting prioritization decisions in personalization/user profiling layer 610.

Figure 7:
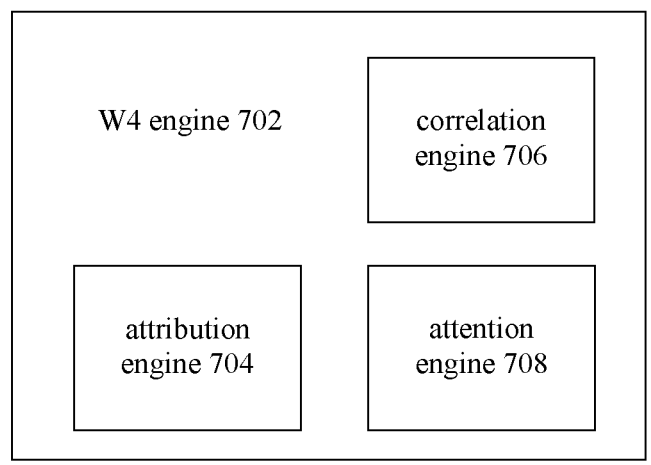
FIG. 7 illustrates an embodiment of analysis components of a W4 engine as shown in FIG. 5.

FIG. 7 illustrates an embodiment of analysis components of a W4 engine as shown in FIG. 5. FIG. 7 shows a block diagram of a W4 engine 702. As shown in FIG. 7, W4 engine 702 includes an attribution engine 704, a correlation engine 706, and an attention engine 708. W4 engine 702 is another example embodiment of network relationship tracking engine 206. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is attribution engine 704. The attribution engine 704 tracks the real-world ownership, control, publishing or other conditional rights of any RWE in any IO. Whenever a new IO is detected by W4 engine 702, e.g., through creation or transmission of a new message, a new transaction record, a new image file, etc., ownership is assigned to the IO. Attribution engine 704 creates this ownership information and further allows this information to be determined for each IO known to the W4 COMN.

As described above, W4 engine 702 further includes correlation engine 706. Correlation engine 706 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of correlation engine 706 is done by graphing the available data. In this embodiment, a histogram of all RWEs and IOs is created, from which correlations based on the graph can be made. Graphing, or the act of creating a histogram, is a computer science method of identifying a distribution of data in order to identify relevant information and make correlations between the data. In a more general mathematical sense, a histogram is simply a mapping $m_i$ that counts the number of observations that fall into various disjoint categories (known as bins), whereas the graph of a histogram is merely one way to represent a histogram. By selecting each IO, RWE, and other known parameters (e.g., times, dates, locations, etc.) as different bins and mapping the available data, relationships between RWEs, IOs and the other parameters can be identified.

As a pre-processor, correlation engine 706 monitors the information provided by RWEs in order to determine if any conditions are identified that can trigger an action on the part of W4 engine 702. For example, if a delivery condition has been associated with a message, when correlation engine 706 determines that the condition is met, it can transmit the appropriate trigger information to W4 engine 702 that triggers delivery of the message.

The attention engine 708 instruments all appropriate network nodes, clouds, users, applications or any combination thereof and includes close interaction with both correlation engine 706 and attribution engine 704.

Figure 8:
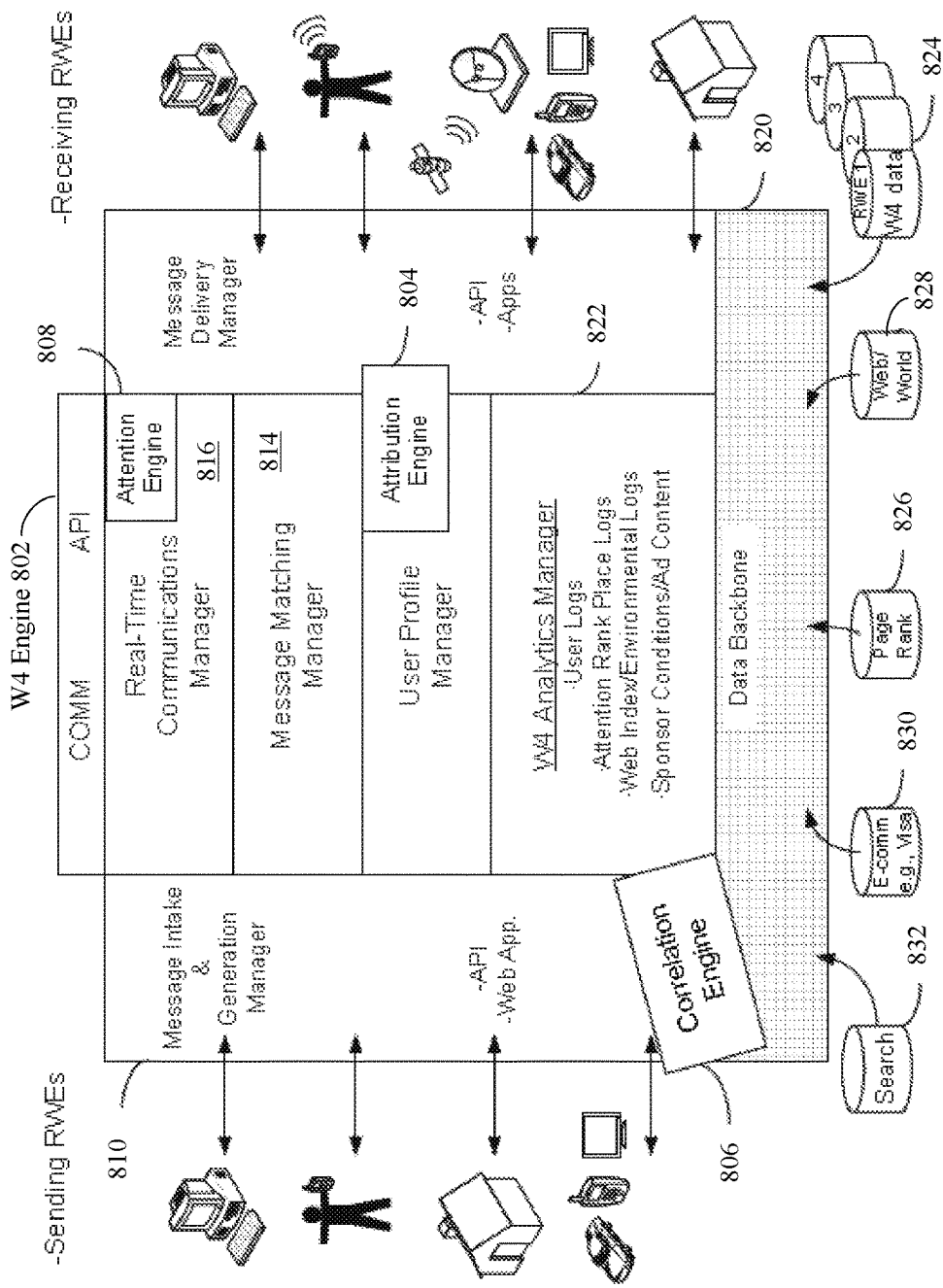
FIG. 8 illustrates an embodiment of a W4 engine showing different components within the sub-engines described generally above with reference to FIG. 7.

FIG. 8 illustrates an embodiment of a W4 engine showing different components within the sub-engines described generally above with reference to FIG. 7. In one embodiment, W4 engine 802 includes an attention engine 808, attribution engine 804 and correlation engine 806 with several sub-managers based upon basic function.

Attention engine 808 includes a message intake and generation manager 810 as well as a message delivery manager 812 that work closely with both a message matching manager 814 and a real-time communications manager 816 to deliver and instrument all communications across the W4 COMN.

Attribution engine 804 works within user profile manager 818 and in conjunction with all other modules to identify, process/verify and represent ownership and rights information related to RWEs, IOs and combinations thereof.

Correlation engine 806 dumps data from both of its channels (sensors and processes) into the same data backbone 820 which is organized and controlled by W4 analytics manager 822 and includes both aggregated and individualized archived versions of data from all network operations including user logs 824, attention rank place logs 826, web indices and environmental logs 818, e-commerce and financial transaction information 830, search indexes and logs 832, sponsor content or conditionals, ad copy and any and all other data used in any W4 COMN process, IO or event. Because of the amount of data that the W4 COMN will potentially store, data backbone 820 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

The interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower data | Time stamps | Interpersonal communication data |
| GPRS data | Local clock | |
| GPS data | Network clock | Media data |
| WiFi data | User input of time data | Relationship data |
| Personal area network data | | Transactional data |
| | | Device interaction data |
| Network access points data | | |
| User input of location data | | |
| Geo-coordinates data | | |

With respect to the interaction data, communications between any RWEs can generate communication data that is transferred via the W4 COMN. For example, the communication data can be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data can be correlated with, for example, temporal data to deduce information regarding frequency of communications, including concentrated communication patterns, which can indicate user activity information.

Logical and IO data refers to the data contained by an IO as well as data associated with the IO such as creation time, owner, associated RWEs, when the IO was last accessed, etc. If the IO is a media object, the term media data can be used. Media data can include any data relating to presentable media, such as audio data, visual data, and audiovisual data. For example, the audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device. The audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like. The media data also includes non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. As described in further detail below, media data can be used, for example, to deduce activities information or preferences information, such as cultural and/or buying preferences information.

The relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
|---|---|
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

B. Example User Information

As described above, user information 220 for each user 210 may include various types and amounts of information.

Figure 9:
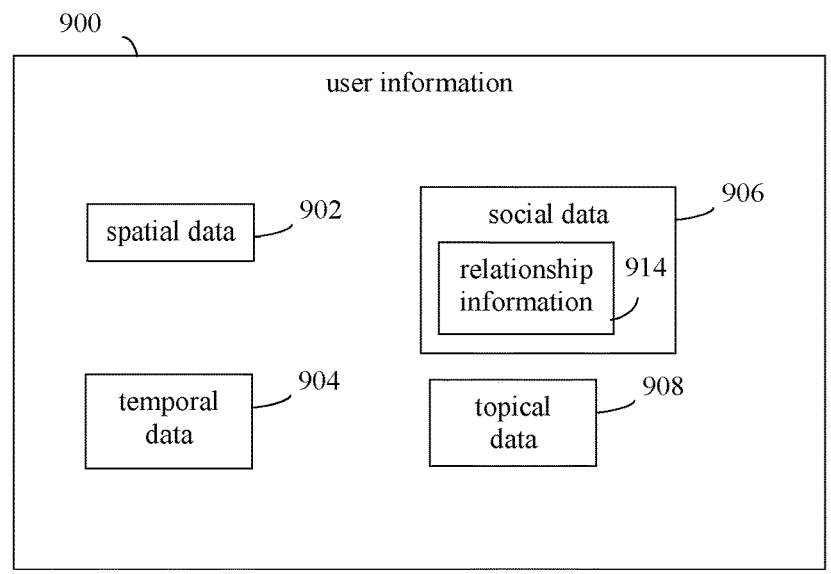
FIG. 9 shows a block diagram of user information, according to an embodiment of the present invention.

The user information included in user information 220 for each user 210 may be actively provided by a user, collected from user devices through network 202 and/or another channel, provided from some other network, system or database that aggregates such data, or by any combination of the foregoing. For example, FIG. 9 shows a block diagram of user information 900, which is an example of user information 220, according to an embodiment of the present invention. User information 900 shown in FIG. 9 may be included in a file or other data structure. Each element of user information 900 shown in FIG. 9 may be one or more data fields, data records, or other type of data entry in a data structure.

As shown in FIG. 9, user information 900 includes spatial data 902, temporal data 904, social data 906 and topical data 908. Each of the elements of user information 900 shown in FIG. 9 is not necessarily present in all embodiments. The elements of user information 900 shown in FIG. 9 are described as follows.

Spatial data 902 may be any information associated with a location of a user and/or an electronic device associated with the user. For example, spatial data 902 may include any passively-collected location data, such as cell tower data, GPRS data, global positioning service (GPS) data, WI-FI data, personal area network data, IP address data and data from other network access points, or actively-collected location data, such as location data entered into a device by a user. Spatial data 902 may be obtained by tracking the path and state of an electronic device (e.g., a user device 402) associated with the user.

Temporal data 904 is time-based data (e.g., time stamps) or metadata (e.g., expiration dates) that relates to specific times and/or events associated with a user and/or an electronic device associated with the user. For example, temporal data 904 may include passively-collected time data (e.g., time data from a clock resident on an electronic device, or time data from a network clock), or actively-collected time data, such as time data entered by the user of the electronic device (e.g., a user-maintained calendar).

Social data 906 may be any data or metadata relating to the relationships of a user of an electronic device. For example, social data 906 may include user identity data, such as gender, age, race, name, an alias, a status of the user (e.g., an online status or a non-online related status) (e.g., at work, at sleep, on vacation, etc.), a social security number, image information (such as a filename for a picture, avatar, or other image representative of the user), and/or other information associated with the user's identity. User identity information may also include e-mail addresses, login names and passwords. Social data 906 may also include social network data. Social network data may include data relating to any relation of the user of the electronic device that is input by a user, such as data relating to a user's friends, family, co-workers, business relations, and the like. Social network data may include, for example, data corresponding with a user-maintained electronic address book. Certain social data may be correlated with, for example, location information to deduce social network data, such as primary relationships (e.g., user-spouse, user-children and user-parent relationships) or other relationships (e.g., user-friends, user-co-worker, user-business associate relationships) and may be weighted by primacy.

For example, as shown in FIG. 9, social data 906 may include relationship information 914. Relationship information 914 includes a list or other data structure indicating friends of the user, including friends that are other users 108 participating in social network 102. Relationship information 914 may include categories for the indicated friends, such as "relatives," "spouse," "parents," "children," "cousins," "best friends," "boss," "co-workers," and/or any other suitable category.

Social data 906 may further include reputation information regarding the user within the confines of social network 102. For example, other users 108 in social network 102 may be able to comment on and/or provide a rating for the user. An overall rating may be determined for the user, which may represent a reputation for the user in social network 102.

Topical data 908 may be any data or metadata concerning subject matter in which a user of an electronic device appears to have an interest or is otherwise associated. Topical data 908 may be actively provided by a user or may be derived from other sources. For example, topical data 908 may include one or more transaction log(s) 904 of transactions involving the user. For example, transaction log(s) 904 may include logs of searches (e.g., query lists/results lists) performed by the user, logs of commerce undertaken by the user, logs of website/webpage browsing by the user, logs of communications (e.g., with friends in social network 102) by the user, etc.

Both social data 906 and topical data 908 may be derived from interaction data. As used herein, the term interaction data refers to any data associated with interactions carried out by a user via an electronic device, whether active or passive. Examples of interaction data include interpersonal communication data, media data, transaction data and device interaction data.

Interpersonal communication data may be any data or metadata that is received from or sent by an electronic device and that is intended as a communication to or from the user. For example, interpersonal communication data may include any data associated with an incoming or outgoing SMS message, e-mail message, voice call (e.g., a cell phone call, a voice over IP call), or other type of interpersonal communication relative to an electronic device, such as information regarding who is sending and receiving the interpersonal communication(s). As described below, interpersonal communication data may be correlated with, for example, temporal data to deduce information regarding frequency of communications, including concentrated communication patterns, which may indicate user activity information.

Media data may be any data or metadata relating to presentable media, such as audio data, visual data and audiovisual data. Audio data may be, for example, data relating to downloaded music, such as genre, artist, album and the like, and may include data regarding ringtones, ring backs, media purchased, playlists, and media shared, to name a few. Visual data may be data relating to images and/or text received by an electronic device (e.g., via the Internet or other network). Visual data may include data relating to images and/or text sent from and/or captured at an electronic device. Audiovisual data may include data or metadata associated with any videos captured at, downloaded to, or otherwise associated with an electronic device.

Media data may also include media presented to a user via a network, such as via the Internet, data relating to text entered and/or received by a user using the network (e.g., search terms), and data relating to interaction with the network media, such as click data (e.g., advertisement banner clicks, bookmarks, click patterns and the like). Thus, media data may include data relating to a user's RSS feeds, subscriptions, group memberships, game services, alerts, and the like. Media data may also include non-network activity, such as image capture and/or video capture using an electronic device, such as a mobile phone. Image data may include metadata added by a user, or other data associated with an image, such as, with respect to photos, location at which the photos were taken, direction of the shot, content of the shot, and time of day, to name a few. As described in further detail below, media data may be used for example, to deduce activities information or preferences information, such as cultural and/or buying preferences information.

Interaction data may also include transactional data or metadata. Transactional data may be any data associated with commercial transactions undertaken by a user via an electronic device, such as vendor information, financial institution information (e.g., bank information), financial account information (e.g., credit card information), merchandise information and cost/prices information, and purchase frequency information, to name a few. Transactional data may be utilized, for example, to deduce activities and preferences information. Transactional information may also be used to deduce types of devices and/or services owned by a user and/or in which a user may have an interest.

Interaction data may also include device interaction data and metadata. Device interaction data may be any data relating to a user's interaction with an electronic device not included in any of the above categories, such as data relating to habitual patterns associated with use of an electronic device. Example of device interaction data include data regarding which applications are used on an electronic system/device and how often and when those applications are used. As described in further detail below, device interaction data may be correlated with temporal data to deduce information regarding user activities and patterns associated therewith.

User information 900 may also include deduced information. The deduced information may be deduced based on one or more of spatial data 902, temporal data 904, social data 906, or topical data 908 as described above. The deduced information may thus include information relating to deduced locations and/or deduced activities of the user. For example, the deduced information may comprise one or more of a primary user location, secondary user location, past locations, present location, and predicted future location information. The deduced information may include information deduced based on a correlation of spatial data 902 in conjunction with temporal data 904 to deduce such location data. By way of illustration, spatial data 902 may be correlated with temporal data 904 to determine that a user of an electronic device is often at one or more specific locations during certain hours of the day. In a particular embodiment, spatial data 902 is correlated with temporal data 904 to determine a primary user location (e.g., home), a secondary location (e.g., school or work) and/or other locations, as well as a cyclical model for a user's spatial/temporal patterns.

The deduced information may also include activity information, such as past activity information, present activity information, and predicted future activity information. In this regard, the past, present, or predicted future activity information may include information relating to past communications and/or co-locations with other users. By way of example, spatial data 902 may be correlated with temporal data 904 to determine a user's activities (e.g., work, recreation and/or home activities).

The deduced information may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user. All preferences may be explicitly provided by a user or implicitly derived from aggregated user and network data.

In one embodiment, routing engine 204 may be capable of weighting spatial, temporal, social, and topical factors differently. Such weighting may be determined automatically based on the context of a routing information request received from a user 210. Since each context may have a potentially unbounded set of associated data, routing engine 204 may, if sufficient information is present, determine a category of the most important factor depending on context. For example, shop hours (a temporal factor) may be a primary factor for a location that is about to close, but may be ignored for calculations performed in the middle of business hours. For example, when a friend is presently shopping at the shop (a social factor), such a social factor may become a most important factor for weighting a spatial distance.

Figure 10:
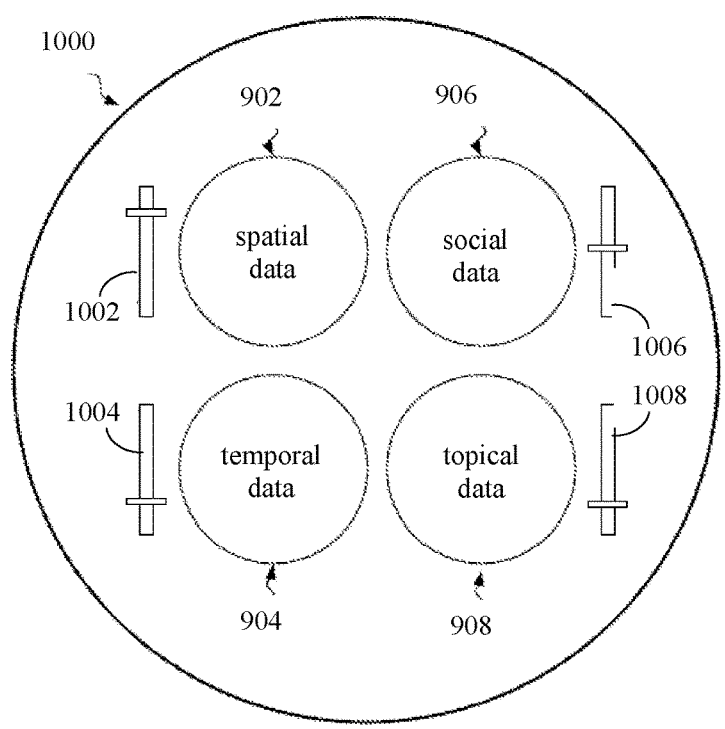
FIG. 10 shows a user interface for weighting user data, according to an example embodiment of the present invention.

In one embodiment every RWE and IO associated with a personalized distance calculation has at least one data point for spatial, temporal, social, and topical factors, and can have large sets of data points for each type of factor. Such factors can be sorted and ranked for weighting a routing calculation. Alternatively, or additionally, a user's weighting preferences may be stored in network 202 and/or in network relationship database 208 in a weighting profile, which can be additionally maintained using a user interface. For instance, FIG. 10 shows a user interface 1000 for weighting user data, according to an example embodiment of the present invention. User interface 1000 can be used to apply differential weights to spatial data 902, temporal data 904, social data 906, and topical data 908 using respective sliders 1002, 1004, 1006, and 1008.

C. Example Routing Engine Embodiments

Figure 11:
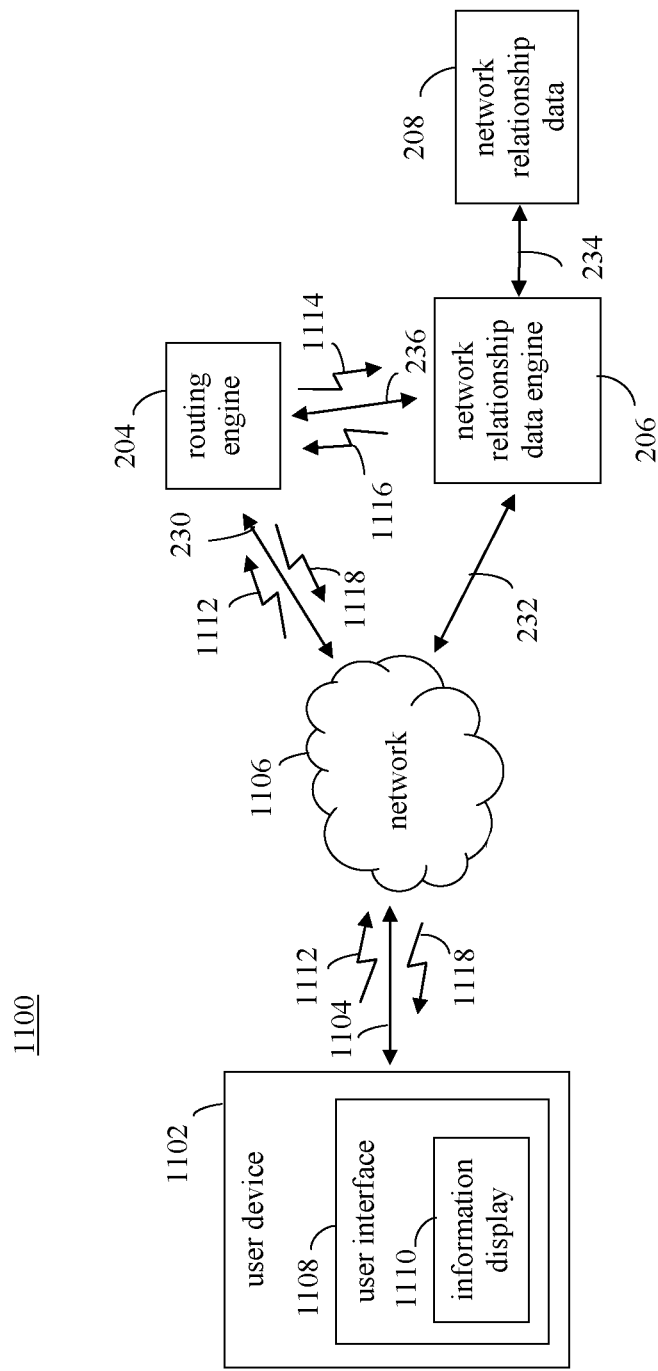
FIGS. 11 and 15 show block diagrams of an example portion of the routing generation and world relationship system of FIG. 2, according to an example embodiment of the present invention.

As shown in FIG. 2, and described above, routing engine 204 is configured to present routing information to requesting users in a tailored manner. For example, FIG. 11 shows a system 1100, which is an example subset or portion of system 200 shown in FIG. 2, according to an embodiment of the present invention. As shown in FIG. 11, system 1100 includes a user device 1102, a network 1106, routing engine 204, network relationship data engine 206, and network relationship data 208. System 1100 is described as follows.

User device 1102 may be any type of electronic device suitable for enabling a user to access routing engine 204 for routing information, including a desktop computer (e.g., a personal computer), a mobile computing device (e.g., a mobile computer such as a personal digital assistant (PDA), a laptop computer, a notebook computer, etc.), or a mobile phone (e.g., a cell phone or a smart phone such as Palm® device, a RIM Blackberry® device, etc.).

A user of user device 1102 may desire routing information. For example, the user may be interested in receiving information (such as in the form of a map) regarding the vicinity of the user's location and/or regarding movements of the user within that vicinity. Alternatively, the user may be traveling from a first location to a second location, and may be interested in receiving directions from the first location to the second location. The user may interact with a user interface 1108 of user device 1102 to request the routing information from routing engine 204. User interface 1102 may include a keyboard, a mouse, a display, a haptic interface, a microphone, a speaker, and/or any other user interface element. For instance, user interface 1108 may provide a web browser which displays a website associated with routing engine 204 into which a request for routing information may be input by the user (and a corresponding response from routing engine 204 may be displayed).

As shown in FIG. 11, user device 1102 generates a routing information request 1112 based on the user's interaction with user interface 1108. Routing information request 1112 is transmitted from user device 1102 over a communication link 1104 (e.g., a wired and/or wireless communication link, as described elsewhere herein), through network 1106, over communication link 230, to routing engine 204. Routing engine 204 receives request 1112, and generates routing information corresponding to request 1112. Furthermore, routing engine 204 generates a network information request 1114 for network information related to the generated routing information. Network information request 1114 is transmitted from routing engine 204 to network relationship data engine 206 over communication link 236 (or through network 1106 via communication links 230 and 232). Network relationship data engine 206 receives request 1114, and accesses network relationship data 208 for related network information over communication link 234.

Network relationship data engine 206 generates a network information response 1116 that includes the related network information obtained from network relationship data 208. Network information response 1116 is transmitted from network relationship data engine 206 over communication link 236 to routing engine 204. Routing engine 204 receives response 1116, and processes the generated routing information to tailor a presentation of the routing information to the user. Routing engine 204 generates a routing information response 1118, which includes the processed routing information. Routing information response 1118 is transmitted from routing engine 204 over communication link 230, through network 1106, over communication link 1104, to user device 1102. Response 1118 is received by user device 1102. An information display 1110 (e.g., one or more speakers, displays, a haptic interface, etc.) of user interface 1108 presents the processed routing information to the user of user device 1102. The processed routing information is presented in a manner that is tailored to the user, including by tailoring a display size, a degree of zoom, a field of view, a refresh rate, a brightness, a color scheme, a volume, a rate of speech, and/or other attribute of the presentation of the processed routing information.

Figure 12:
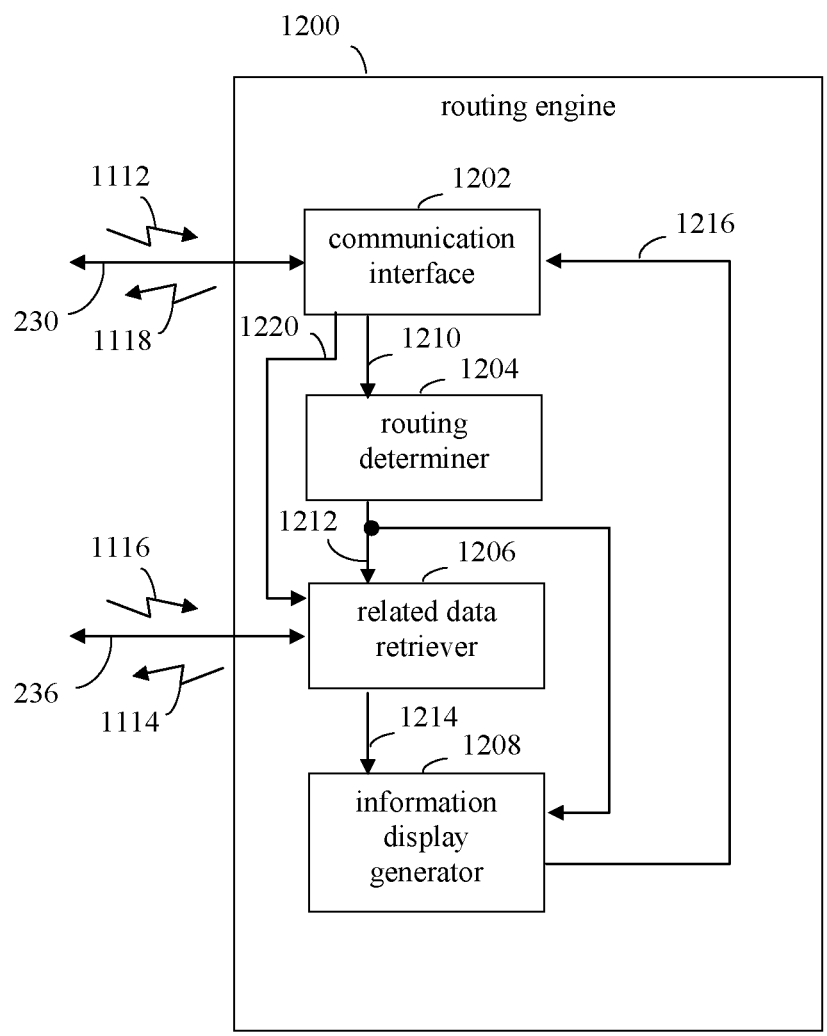
FIGS. 12 and 16 show block diagrams of a routing engine, according to an example embodiment of the present invention.

Routing engine 204 shown in FIGS. 2 and 11 may be implemented in a variety of ways. For instance, FIG. 12 shows a block diagram of a routing engine 1200, according to an example embodiment of the present invention. Routing engine 1200 is an example of routing engine 204. As shown in FIG. 12, routing engine 1200 includes a communication interface 1202, a routing determiner 1204, a related data retriever 1206, and an information display generator 1208. These elements of routing engine 1200 are described as follows.

Communication interface 1202 is configured as an interface that enables routing engine 1200 to communicate over network 1106 (shown in FIG. 11) through communication link 230. As shown in FIG. 12, communication interface 1202 is coupled to communication link 230. Communication interface 1202 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc. As shown in FIG. 12, communication interface 1202 may receive routing information request 1112 from a user.

Routing determiner 1204 is configured to generate routing information based on one or more locations indicated by a user. For example, as shown in FIG. 12, routing determiner 1204 may receive location information 1210 from communication interface 1202, which may include location information received from a user. Routing determiner 1204 is configured to generate routing information based on location information 1210, including generating a route between one or more locations, such as a first location and a second location, received in location information 1210, or generating information (e.g., a map) representative of a location provided in location information 1210. As shown in FIG. 12, routing determiner 1204 generates routing information 1212.

Related data retriever 1206 is configured to generate network information request 1114 for network information related to the generated routing information of routing information 1212 and/or related to the user. In an embodiment, network information request 1114 is a request for W4 data related to routing information 1212 and/or the user. As shown in FIG. 12, related data retriever 1206 receives routing information 1212. Furthermore, related data retriever 1206 receives user data 1220 from communication interface 1202. User data 1220 includes identifying information regarding the user, such as a name of the user, an e-mail address of the user, an IP address of a computing device of the user, and/or any other identifying information of the user, and may include further information regarding the user. Related data retriever 1206 packages user data 1220 with routing information 1212 in network information request 1114. In the embodiment of FIG. 12, related data retriever 1206 is configured to communicate over communication link 236 with network relationship data engine 206. In another embodiment, communication interface 1202 may be configured to transmit network information request 1114 to network relationship data engine 206 through communication link 230, network 1106, and communication link 232 to related data retriever 1206.

In an embodiment, network relationship data engine 206 may be configured to correlate the user data and routing information received in network information request 1114 with the network information stored in network relationship database 208 to generate network information response 1116. For example, in an embodiment, network relationship data engine 206 includes correlation engine 706 shown in FIG. 7. Correlation engine 706 may be configured to identify associated RWEs and IOs of the received user data and routing information (e.g., one or more locations included therein) and their relationships (such as by creating a combined graph of any combination of RWEs and IOs and their attributes, relationships and reputations within contexts or situations). For instance, a histogram of RWEs and IOs may be created, from which correlations based on the graph can be made as a mapping $m_i$ that counts the number of observations that fall into various disjoint categories (known as bins). By selecting each IO, RWE, and other known parameters (e.g., times, dates, locations, etc.) as different bins and mapping the available data, relationships between RWEs, IOs and the other parameters can be identified, and output in network information response 1116.

Related data retriever 1206 receives network information response 1116 (e.g., from communication interface 1202 or over communication link 236), and outputs network information 1214. Network information 1214 includes one or more of spatial data, temporal data, social data, or topical data (e.g., W4 data) related to user data 1220 and/or routing information 1212.

Information display generator 1218 receives routing information 1212 and network information 1214, and is configured to generate an information display that indicates location and/or routing information of routing information 1212, and is processed according to the location and/or routing information of routing information 1212 and/or the spatial data, temporal data, social data, and/or topical data of network information 1214. As shown in FIG. 12, information display generator 1208 generates information display data 1216. Information display data 1216 includes information display data that may be received and used by an electronic device (e.g., user device 1102) to generate information display 1110. For example, information display data 1216 may include graphical/video display data (e.g., map data), audio display data (e.g., voice travel instructions in digital form), haptic interface output data, and/or other information display data. Information display data 1216 is received by communication interface 1202, and may be transmitted to a requesting user by communication interface 1202 in routing information response 1118.

The following subsection describes example embodiments for the generation of tailored routing information, which may be performed by routing engine 1200.

D. Example Embodiments for Tailored Routing Generation

Routing engine 204 may tailor the presentation of routing information in a dynamic fashion that may be predictive (e.g., may predict future movements in space by the user and/or other RWEs in the environment). Because network 202 and network relationship tracking engine 206 may be constantly collecting and analyzing actual real-time data regarding a user's movements through space, as well as similar data regarding other users 210 (including users that the user may or may not like), network 202 and network relationship tracking engine 206 (e.g., the W4 Engine) are able to maintain a view of the user's associated W4 data, which may be used to present a personalized presentation (e.g., W4COMN services and applications) to the user in real-time.

In an embodiment, a W4 map may be displayed and interacted with by a user device either constantly, as the user moves along a route, or intermittently, as the user device registers itself with the W4 engine (e.g., as the user device independently reports rate and mode of motion information or has it automatically associated from the user's and/or user device profile (as well as any corroborating W4 sensor source)).

Routing engine 204 may be configured to operate according to various modes. For instance, in a first mode, a user may plan a route by submitting two or more locations (e.g., one or more destinations) to routing engine 204 in a routing request. Routing engine 204 may be configured to tailor a presentation of the route according to network information associated with the user, as described herein. In a second mode, the user may be in the act of following a planned route. Routing engine 204 may be configured to suggest modifications to the planned route and/or to suggest additional routes, according to the network information, as described herein. In a third mode (e.g., a "live" mode), the user may not input a planned route, and instead may go about moving throughout their day. Routing engine 204 may be configured to track movements of the user and to predict future actions of the user (e.g., based on their movements, the time of day, past daily habits of the user, etc., and/or other W4 data) and to suggest routes, destinations, etc., to the user based on the network information associated with the user, as described herein.

Figure 13:
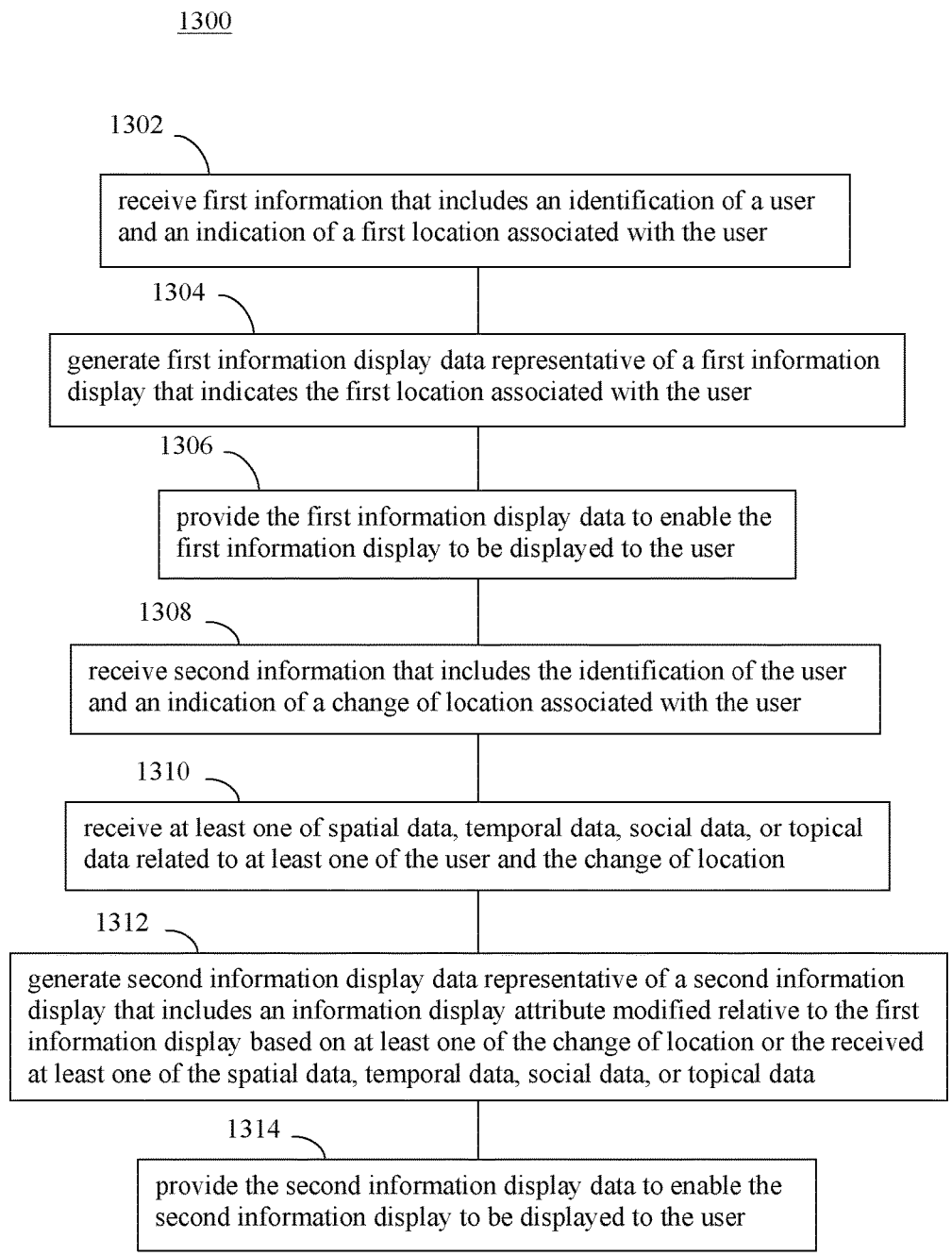
FIG. 13 shows a flowchart for generating routing information, according to an example embodiment of the present invention.

Routing engine 204 may generate routing information that may be presented to users in a tailored fashion in various ways, and with respect to various forms of network information. For instance, FIG. 13 shows a flowchart 1300 for generating routing information, according to an example embodiment of the present invention. Flowchart 1300 may be performed by routing engine 204 (e.g., routing engine 1200 shown in FIG. 12), for example. For illustrative purposes, flowchart 1300 is described with respect to FIGS. 11 and 12. Further structural and operational embodiments will be apparent to persons skilled in the relevant art(s) based on the discussion regarding flowchart 1300. Flowchart 1300 is described as follows.

Flowchart 1300 begins with step 1302. In step 1302, first information is received that includes an identification of a user and an indication of a first location associated with the user. For example, as shown in FIG. 11, routing information request 1112 is received by routing engine 204 from user device 1102. Routing information request 1112 may include an indication of the first location associated with the user of user device 102, and may include an identification of the user. The current location of the user may have been input by the user into user device 1102, may have been determined by a global positioning system (GPS) module or other position determining device of user device 1102, or may have been determined in another manner. Furthermore, routing information request 1112 may include identifying information of user, including a name of the user, a login ID of the user, an IP address of user device 102, and/or other identifying information.

As shown in FIG. 12, routing information request 1112 may be received by communication interface 1202. Communication interface 1202 may extract location information from routing information request 1112, and generate location information 1210. Location information 1210 is received by routing determiner 1204. Routing determiner 1204 may generate location and/or routing data that includes the first location associated with the user, which is output as routing information 1212.

In step 1304, first information display data representative of a first information display is generated that indicates the first location associated with the user. For example, as shown in FIG. 12, information display generator 1208 receives routing information 1212. As described above, information display generator 1208 is configured to generate information display data 1216. Information display data 1216 may include visual display data, audio display data, haptic interface data, and/or any other suitable information display data generated by information display generator 1208 that is representative of routing information 1212.

Note that in an embodiment, related data retriever 1206 may optionally retrieve network information (e.g., spatial data 902, temporal data 904, social data 906, and/or topical data 908 related to the user and/or the first location), which may be used to process routing information 1212 by information display generator 1208, to generate information display data 1216. In this manner, an information display may be generated having at least one attribute that is configured/modified according to the retrieved network information. Alternatively, information display generator 1208 may generate information display data 1216 without such processing.

In step 1306, the first information display data is provided to enable the first information display to be displayed to the user. For example, as shown in FIG. 12, communication interface 1202 receives information display data 1216 and transmits routing information response 1118 to user device 1102. User device 1102 receives routing information response 1118, extracts information display data 1218 from routing information response 1118, and generates an information display 1110 which is presented in the user interface 1108. Information display 1110 may be a visual, audio, haptic, and/or other type of user interface presentation that is generated from information display data 1218.

Figure 14:
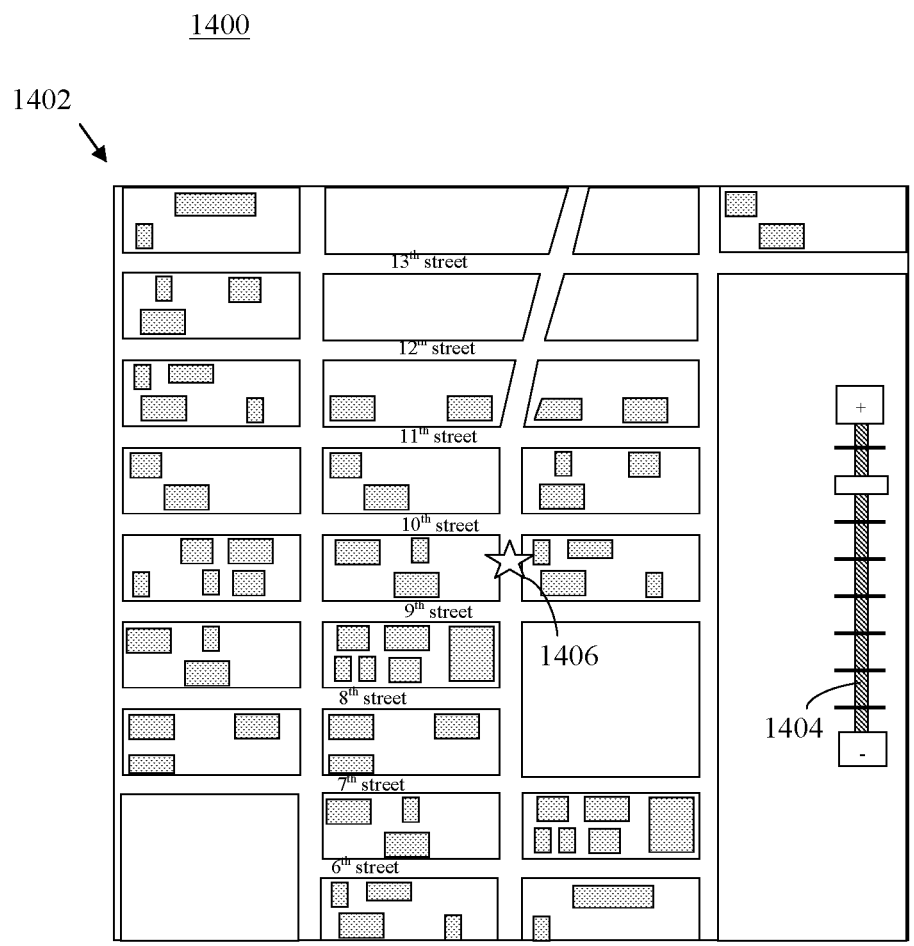
FIGS. 14 and 17-21 show example information displays, according to embodiments of the present invention.

For instance, FIG. 14 shows an example information display 1400, according to an embodiment of the present invention. Information display 1400 may be generated by user interface 1108 from information display data 1218 received in routing information response 1118. As shown in FIG. 14, information display 1400 includes a map 1402 and a zoom level indicator element 1404. Map 1402 is a map of a town or city, and indicates a location associated with the user with a user location indicator 1406. Alternatively or additionally, information display 1400 may include an audio recitation and/or tactile information regarding map 1402.

Figure 15:
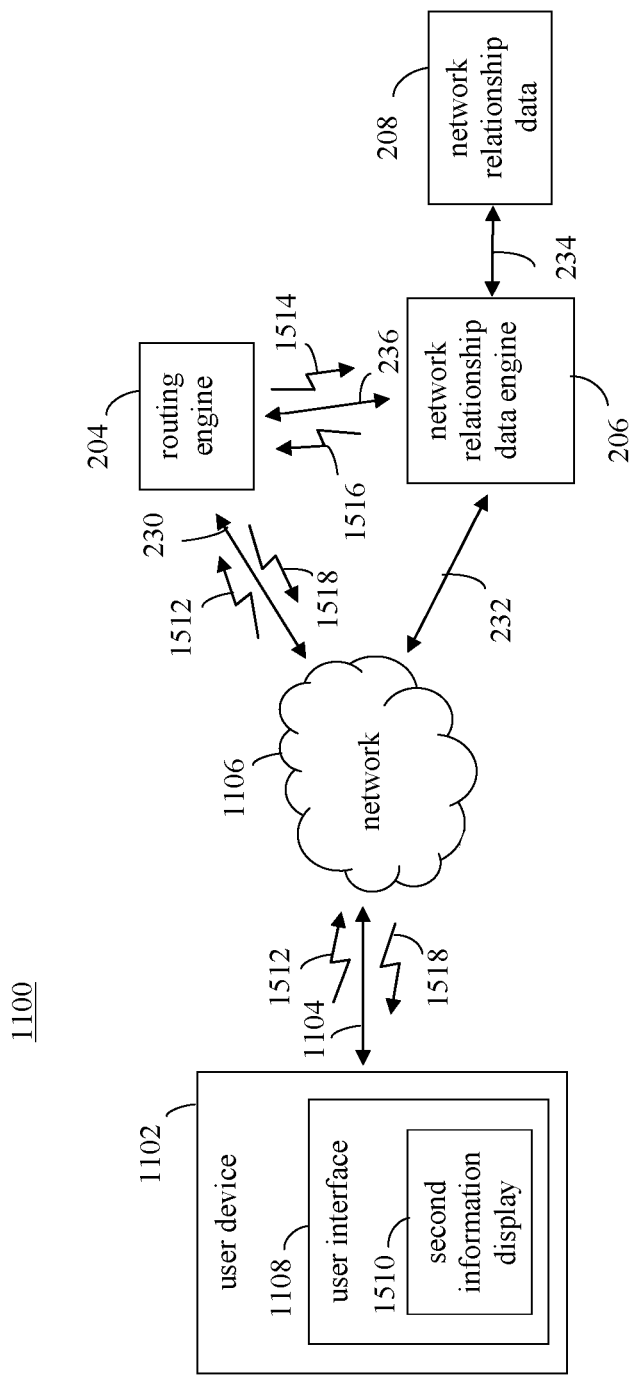

In step 1308, second information is received that includes the identification of the user and an indication of a change of location associated with the user. For example, the user of user device 1102 may have moved from the first location to a second location, and another routing information request may be generated with respect to the second location. For example, FIG. 15 shows system 1100 of FIG. 11, where the user of user device 1102 has moved from the first location to another location. In a similar fashion as described above with respect to step 1302, a second routing information request 1512 may generated by user device 1102, and received by routing engine 204. Second routing information request 1512 may include second information that includes an identification of the user and an indication of the movement of the user. The movement of the user may have been input by the user into user device 1102, determined by a global positioning system (GPS) module or other position determining device of user device 1102, or may have been determined in another manner.

Figure 16:
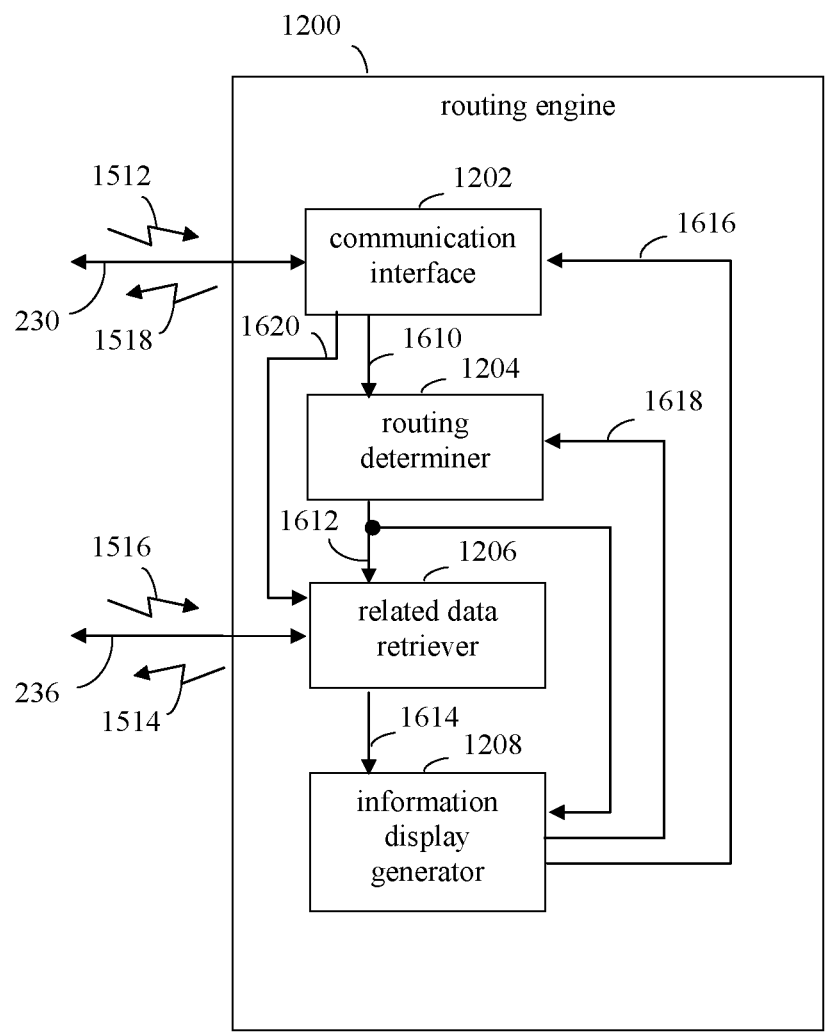

FIG. 16 shows routing engine 1200, where second routing information request 1512 is received and processed. As shown in FIG. 16, second routing information request 1512 may be received by communication interface 1202. Communication interface 1202 may extract location information regarding the change in location from second routing information request 1512, and may generate a second location information 1610. Second location information 1610 is received by routing determiner 1204. Routing determiner 1204 may generate location and/or routing data that indicates the change of location, which is output as second routing information 1612

In step 1310, at least one of spatial data, temporal data, social data, or topical data related to at least one of the user and the change of location is received. As shown in FIG. 16, related data retriever 1206 receives routing information 1612. Related data retriever 1206 is configured to generate a network information request 1514 based on information regarding the user and the change of location of the user. As shown in FIG. 15, network information request 1514 is transmitted to network relationship data engine 206. As described above, network relationship data engine 206 generates a network information response 1516 (e.g., using correlation engine 706) to include network information, such as spatial data 902, temporal data 904, social data 906, and/or topical data 908 related to the user and the change of location. Network information response 1516 is transmitted from network relationship data engine 206 to related data retriever 1206.

In step 1312, second information display data representative of a second information display is generated that includes an information display attribute modified relative to the first information display based on at least one of the change of location or the received at least one of the spatial data, temporal data, social data, or topical data. For example, as shown in FIG. 12, information display generator 1208 receives second routing information 1612. As described above, information display generator 1208 may be configured to process second routing information 1612 based on network information received in network information response 1516 to generate second information display data 1616. Information display generator 1208 may process second routing information 1612 based on spatial data 902, temporal data 904, social data 906, and/or topical data 908 related to the user and the change of location received in network information response 1516. Second information display data 1616 may include visual display data, audio display data, haptic interface data, and/or any other suitable information display data.

In step 1314, the second information display data is provided to enable the second information display to be displayed to the user. For example, as shown in FIG. 12, communication interface 1202 receives second information display data 1616 and transmits a second routing information response 1518 to user device 1102. User device 1102 receives second routing information response 1518, extracts second information display data 1616 from second routing information response 1518, and generates a second information display 1510 which is presented to the user by user interface 1108. Second information display 1510 may be a visual, audio, haptic, and/or other type of user interface presentation that is generated from information display data 1616. Second information display 1610 includes an information display attribute that is modified relative to first information display 1110.

A variety of information display attributes may be modified in second information display 1510 relative to first information display 1110 based on the change of location and/or spatial data 902, temporal data 904, social data 906, and/or topical data 908. Examples of information display attributes that may be modified include a modified size, a degree of zoom, a field of view, a refresh rate, a brightness, a display space allocated to sponsored content, a color scheme, a volume, a rate of speech, and/or other modified attribute.

Figure 17:
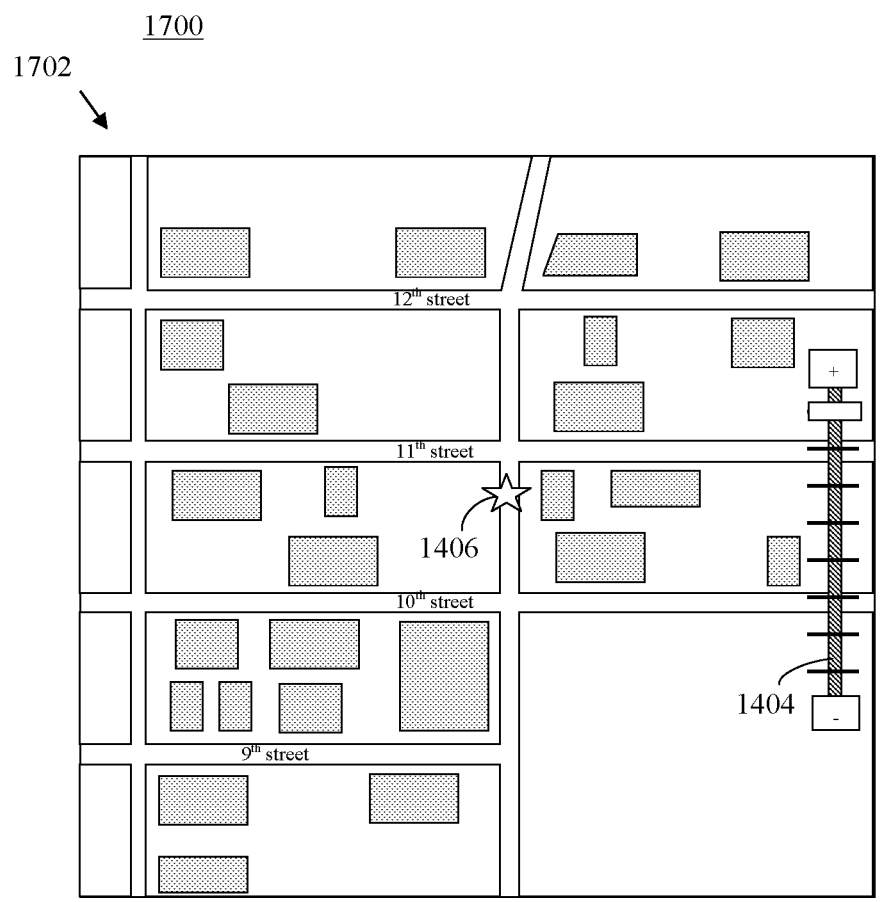
Figure 18:
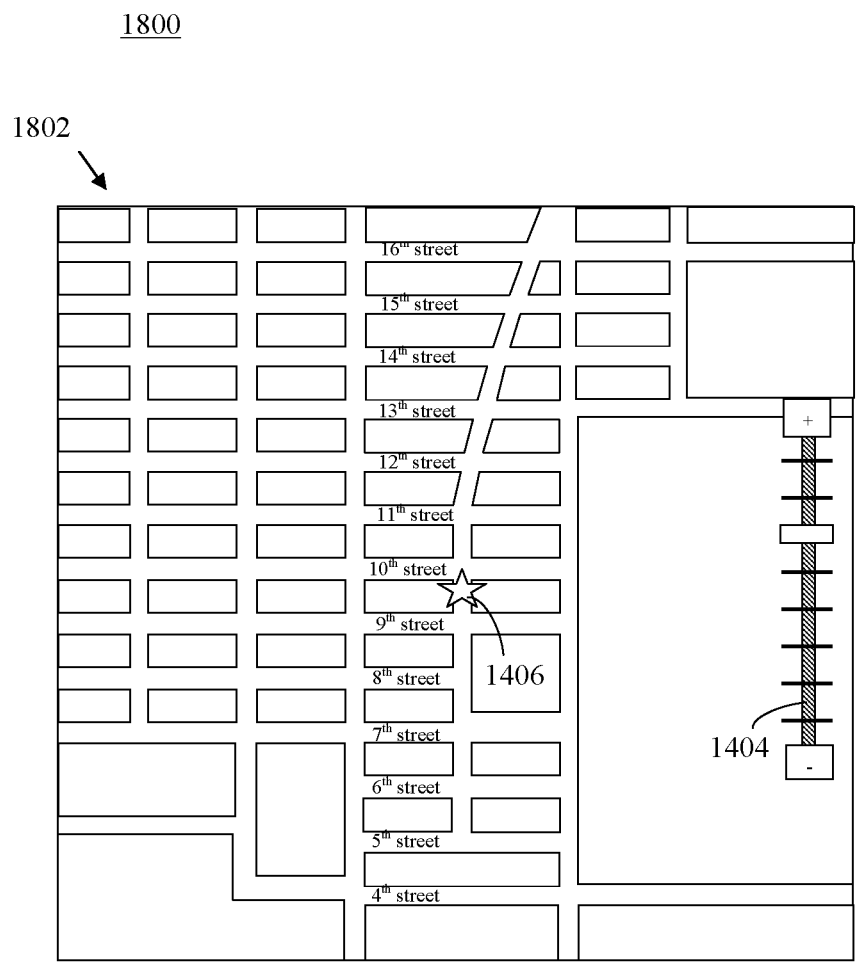

In one embodiment, a degree of zoom attribute of an information display may be modified based on the change of location and/or spatial data 902, temporal data 904, social data 906, and/or topical data 908. For instance, FIGS. 17 and 18 illustrate information displays 1700 and 1800, respectively, with modified zoom attributes, according to embodiment of the present invention. Information displays 1700 and 1800 are examples of second information display 1510 shown in FIG. 15, and may be generated by user interface 1108 from information display data 1616 received in routing information response 1518.

As shown in FIG. 17, information display 1700 includes a map 1702 and zoom level indicator element 1404. Map 1702 shows user location indicator 1406, which indicates a location associated with the user. Map 1702 shows a subsection of map 1402 shown in FIG. 14. A degree of zoom provided by information display 1700 for map 1702 is higher than a degree of zoom provided by information display 1400. As shown in FIG. 18, information display 1800 includes a map 1802 and zoom level indicator element 1404. Map 1802 shows a subsection of map 1402 shown in FIG. 14, and shows user location indicator 1406. A degree of zoom provided by information display 1800 for map 1802 is lower than the degree of zoom provided by information display 1400, or than the degree of zoom provided by information display 1700.

The higher and lower degrees of zoom of information displays 1700 and 1800 may be provided based on the change of location and/or spatial data 902, temporal data 904, social data 906, and/or topical data 908. For example, information display generator 1208 shown in FIGS. 12 and 16 may process routing information 1216 based on the change of location and/or based on spatial data 902, temporal data 904, social data 906, and/or topical data 908 indicated by network information response 1516. For instance, information display generator 1208 may use spatial data 902 or a difference between the first location of the user (indicated in routing information request 1512) and a second location of the user (indicated second routing information request 1512) in combination with temporal data 904 (e.g., a passage in time between the user being located in the first location and in the second location) to determine a rate of the change of location (a speed or velocity) associated with the user. Information display generator 1208 may modify an information display attribute in second information display data 1614 relative to first information display data 1214 based on the determined rate of the change of location. For example, if the user is determined to be moving relatively faster at the second location than at the first location, the degree of zoom may be decreased (e.g., from the medium degree of zoom of information display 1400 in FIG. 14 to the lower degree of zoom of information display 1800 in FIG. 18) to provide a larger field of view. If the user is determined to be moving relatively slower at the second location than at the first location, the degree of zoom may be increased (e.g., from the medium degree of zoom of information display 1400 in FIG. 14 to the higher degree of zoom of information display 1700 in FIG. 17) to decrease the field of view.

In another example, information display generator 1208 may determine a change in a mode of transportation of the user at the second location relative to the first location based on the change of location and/or based on spatial data 902, temporal data 904, social data 906, and/or topical data 908 indicated by network information response 1516. Information display generator 1208 may modify an information display attribute in second information display data 1614 relative to first information display data 1214 based on the determined change in transportation mode. Examples modes of transportation may include "on foot" (e.g., walking or running), bicycling, driving (e.g., car, motorcycle, bus, etc.), flying (e.g., by airplane or helicopter), transport by train, transport by subway, etc. For instance, spatial data 902 and/or temporal data 904 may be used to determine the change in the mode of transportation by being used to determine a rate of change of location, as described above, and this rate of change of location may be correlated with a path of travel to determine a mode of transportation. For example, a speed of 0-3 MPH may correlate to walking, a speed of 4-10 MPH may correlate to running, a speed of 0-20 may correlate to biking, a speed of 0-100 may correlate to driving or taking a train, a speed greater than 100 may correlate to flying, etc. Traveling along a road may correlate to driving or biking, traveling along a sidewalk may correlate to walking or running, traveling along train tracks may correlate to taking a train, traveling over water may correlate to boating or flying, etc. By correlating the rate of change of location to the travel path and/or to further network information, the mode of transportation of the user may be determined.

Information display generator 1208 may modify an information display attribute in second information display data 1614 relative to first information display data 1214 based on the determined mode of transportation. For example, if the user is determined to traveling using a faster mode of transportation at the second location than at the first location, the degree of zoom may be decreased (e.g., from the medium degree of zoom of information display 1400 in FIG. 14 to the lower degree of zoom of information display 1800 in FIG. 18) to provide a larger field of view. If the user is determined to be traveling using a slower mode of transportation at the second location than at the first location, the degree of zoom may be increased (e.g., from the medium degree of zoom of information display 1400 in FIG. 14 to the higher degree of zoom of information display 1700 in FIG. 17) to decrease the field of view.

Figure 19:
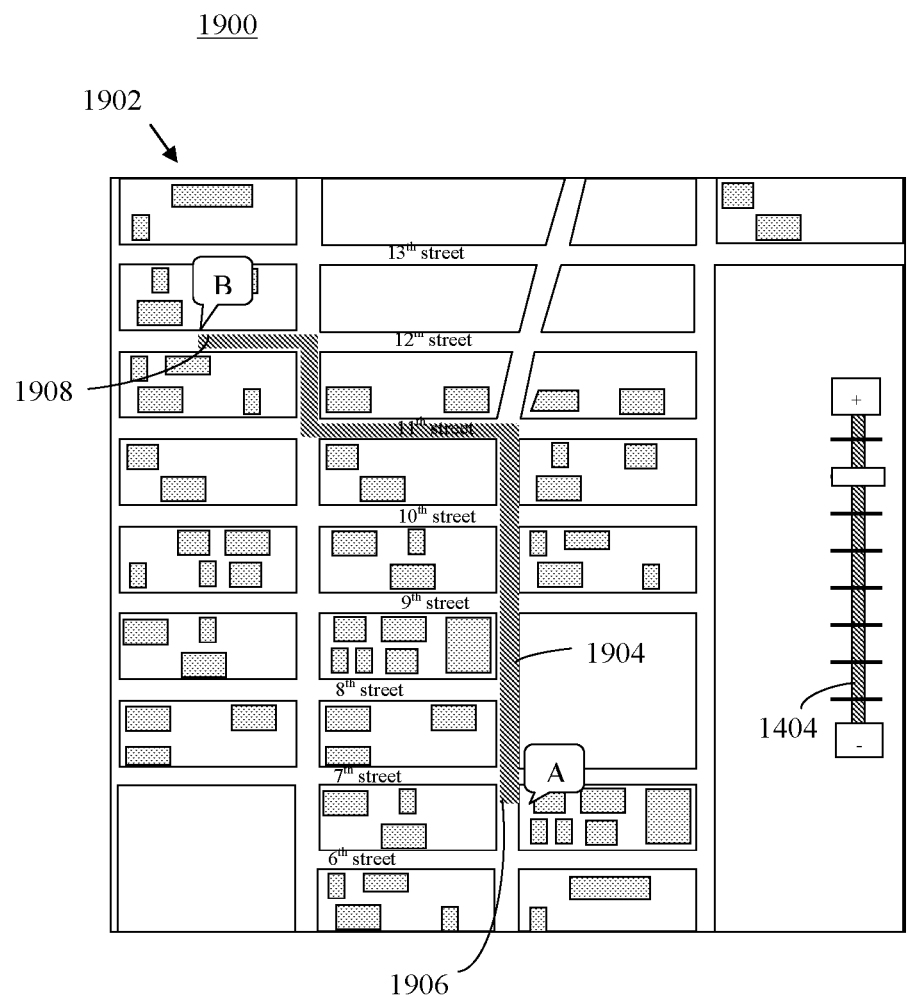

As described above, routing determiner 1204 may be configured to generate a route between the first location associated with the user and a destination location submitted by the user to routing engine 1200, and the route may be presented to the user in an information display. For example, FIG. 19 shows an information display 1900, according to embodiment of the present invention. Information display 1900 is an example of information display 1110 shown in FIG. 11, and may be generated by user interface 1108 from information display data 1216 received in routing information response 1118. As shown in FIG. 19, information display 1900 shows a map 1902 that includes a route 1904 through a town or city between a first location 1906 and a second location 1908. First location 1906 may be a location of the user (e.g., a location of user device 1102) or a location input the user, and second location 1908 may be a desired destination location for the user.

Figure 20:
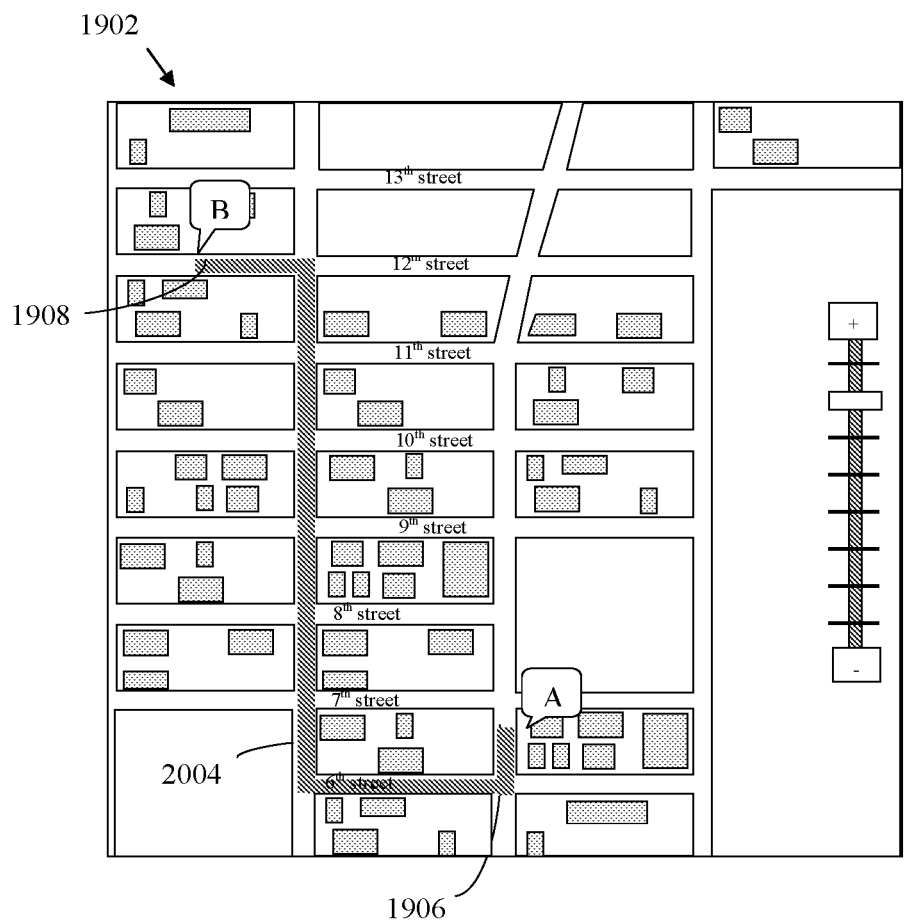

In an embodiment, information display generator 1208 may be configured to modify the determined route based at least on at least one of the change of location or the received at least one of spatial data 902, temporal data 904, social data 906, and/or topical data 908. For example, FIG. 20 shows an information display 2000, according to embodiment of the present invention. Information display 2000 is an example of information display 1510 shown in FIG. 15, and may be generated by user interface 1108 from information display data 1616 received in routing information response 1518. As shown in FIG. 20, information display 2000 shows map 1902 that includes a route 2004 between first location 1906 and second location 1908, which is a different route between first and second locations 1906 and 1908 from route 1904 shown in FIG. 19. Information display generator 1208 may modify the route for the user from route 1904 to route 2004 in second information display data 1614 relative to first information display data 1214 based the change of location and/or the received at least one of spatial data 902, temporal data 904, social data 906, and/or topical data 908.

For example, although route 1904 may be a more direct route from first location 1906 to second location 1908, spatial data 902, temporal data 904, social data 906, and/or topical data 908 may indicate relatively bad traffic on route 1904 relative to route 2004 at the current time of day on average (e.g., temporal data 904 and spatial data 902) or by actual traffic monitoring, may indicate that the user may encounter friends (e.g., in a friend's list of social data 906)

currently located along route 2004 at a restaurant, pub, store, etc. (e.g., spatial data 902, topical data 908), may aid the user in avoiding persons the user does not like (e.g., social data 906) that are currently located along route 1904, may indicate that a store of interest to the user lies along route 2004 (e.g., dry cleaners for dropping off the user's clothes, which may be in the user's car) (e.g., spatial data 902, topical data 908), may suggest diverting to a gas station to fill with gas a vehicle in which the user is riding (e.g., if the car is configured to indicate with a communication signal or other technique that it is low on gas), and/or may indicate other reason for the user to travel route 2004 rather than route 1904.

In an embodiment, as shown in FIG. 16, information display generator 1208 may determine a need for a modified route, such as route 2004, and may transmit a modified route request 1618, which is received by routing determiner 1204. Modified route request 1618 may include additional locations through which a route should be generated in addition to first and second locations 1906 and 1908. Routing determiner 1204 generates modified routing information, which is output as routing information 1612, and received by information display generator 1208. Information display generator 1208 generates information display data 1616 corresponding to the modified routing information, which is received by communication interface 1202 for transmission to the user (to be displayed as route 2004).

Figure 21:
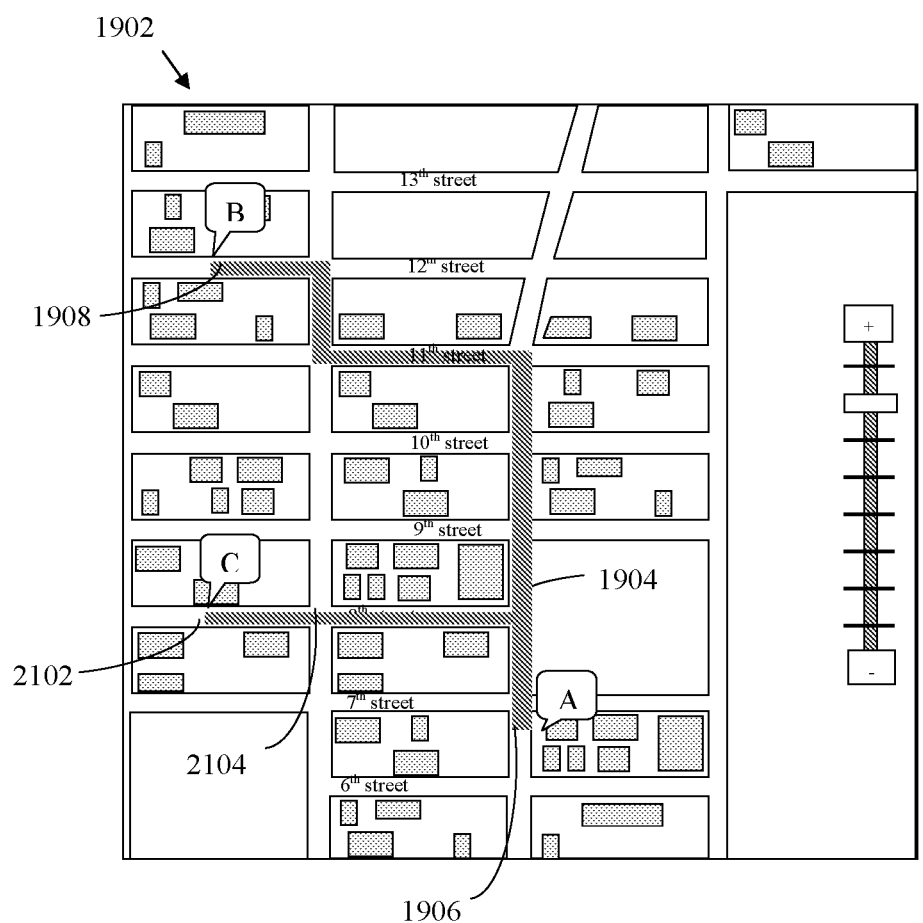

In another embodiment, information display generator 1208 may be configured to modify a determined route by determining a second destination location based on the at least one of the change of location or the spatial data 902, temporal data 904, social data 906, and/or topical data 908. For example, FIG. 21 shows an information display 2100, according to embodiment of the present invention. Information display 2100 is an example of information display 1510 shown in FIG. 15, and may be generated by user interface 1108 from information display data 1616 received in routing information response 1518. As shown in FIG. 21, information display 2100 shows map 1902 that includes route 1904 between first location 1906 and second location 1908, and further includes a second route 2104 from first location 1906 to a third location 2102, which is a destination location suggested to the user by information display generator 1208. Information display generator 1208 may request that second route 2104 be generated by routing determiner 1204 in a similar fashion as described above for a modified route (e.g., route 2004). Information display generator 1208 may insert the route information for route 2104 in second information display data 1614 based the change of location and/or the received at least one of spatial data 902, temporal data 904, social data 906, and/or topical data 908.

For example, spatial data 902, temporal data 904, social data 906, and/or topical data 908 may indicate one or more further destinations of interest to the user. For instance, the user may be a member of a gym (topical data 908 and spatial data 902) which has a location at third location 2102, and may frequently work out at the current time of day (temporal data 904). Alternatively, friends of the user may be located at third location 2102, which may be the location of a restaurant, pub, store, etc. (e.g., social data 906, spatial data 902, and topical data 908)), a store of interest to the user may be located at third location 2102 (e.g., dry cleaners, clothing store, etc.), and/or other objects, persons, and/or events of interest to the user may be located at third location 2102, as determined based on spatial data 902, temporal data 904, social data 906, and/or topical data 908 and/or the change of location.

As described above, in embodiments, additional or alternative visual information display attributes other than degree of zoom or routing may be modified, including a resolution at which the map is displayed in the second information display, a brightness at which the map is displayed, a color scheme a which the map is displayed, a video refresh rate at which the map is displayed, one or more navigational control elements may be displayed or modified, a display space associated with sponsored content (e.g., one or more advertisements), etc.

Furthermore, although many of the examples described above relate to visual information display attributes, other types of information display attributes may be modified, including attributes of audio information displays and/or haptic information displays. For instance, one or more of a rate at which an auditory signal (e.g., verbal directions) is provided to the user, a volume of the auditory signal, and/or other audio attribute may be modified. For example, if it is determined that the rate of change of location of the user is increased, the rate at which verbal directions are provided to the user may be increased, and if it is determined that the rate of change of location is decreased, the rate at which verbal directions are provided to the user may be decreased.

Figure 22:
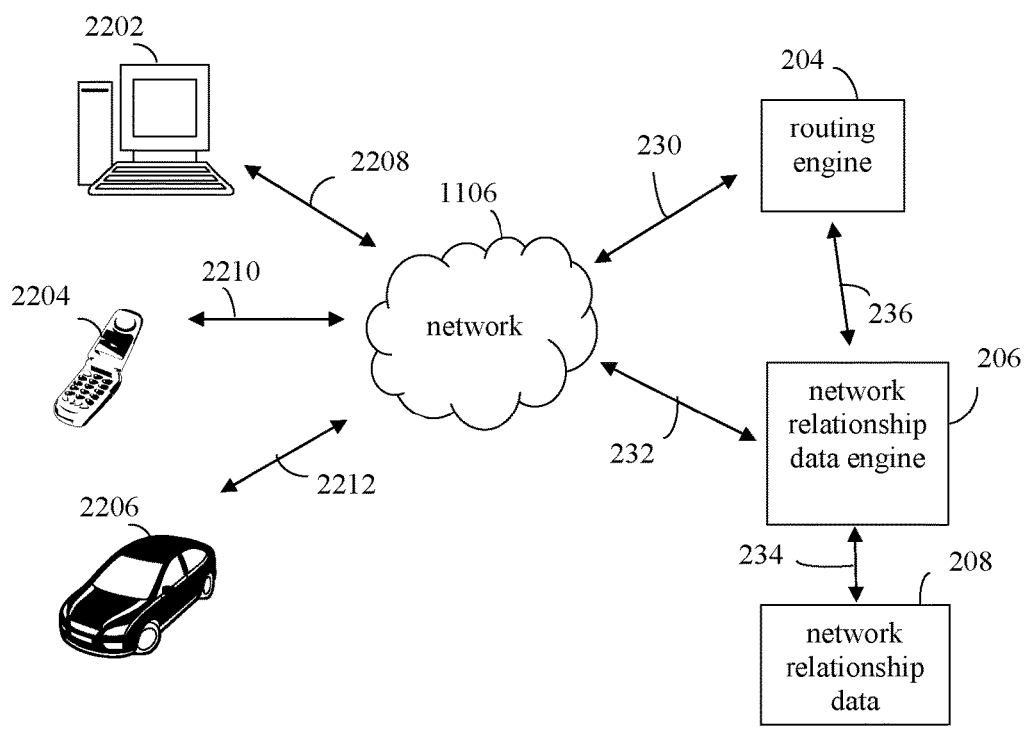
FIG. 22 illustrates an example of the system of FIG. 11, where a user is enabled to interact with multiple user devices, according an embodiment of the present invention.

Furthermore, although some of the examples provided herein are described with respect to a user that interacts with a single user device (e.g., user device 1102), embodiments of the present invention may enable the user to interact with various user devices during different time periods, including enabling an manual or automatic switch over from one device to another device. For instance, FIG. 22 illustrates an example of system 1100 of FIG. 11, where a user is enabled to interact with multiple user devices, according an embodiment of the present invention. As shown in FIG. 22, system 1100 includes a first user device 2202, a second user device 2204, a third user device 2206, network 1106, routing engine 204, network relationship data engine 206, and network relationship data 208. During different time periods, a user may interact with a different one of first-third user devices 2202, 2204, and 2206 to communicate with routing engine 204.

For example, the user may have multi-part route or trip through the local environment. The user may initially be located at home or work, for instance. The user may first interact with routing engine 204 using first user device 2202, which may be a desktop computer. The user may use routing engine 204 to generate a route to a first destination. The user may then leave home or the office on foot, to travel to the first destination. While on foot, the user may interact with routing engine 204 using second user device 2204, which may be a mobile electronic device, such as a cell phone. The user may monitor the generated route on an information display generated by second user device 2204, including viewing modification to attributes of the information display generated according to embodiments of the present invention. The user may then leave reach his/her car, to travel to a second destination. The user may interact with routing engine 204 using third user device 2206, which may be an electronic device integrated with the car. For example, third user device 2206 may include a display in a dashboard of the car, a heads up display (e.g., projected on the windshield of the car), or other display in the car. In another example, third user device 2206 may be a headset or hands-free speaker (that provides audio driving instructions) that is activated when the user enters the car. The user may monitor the generated route on an information display generated by third user device 2206, including viewing modification to attributes of the information display generated according to embodiments of the present invention.

The user may park the car at a train station to take a train to a fourth destination. While on the train, the user may interact with routing engine 204 using second user device 2204. The user may monitor the generated route on an information display generated by second user device 2204, including viewing modification to attributes of the information display generated according to embodiments of the present invention. Along all routes to the various destinations, routing engine 204 enables a dynamic, automatically adjusting map or real-time route support interface for the user based upon his or her variable motion through spacetime.

In another example, a plurality of presentation "profiles" may be maintained, which can be used to provide a particular information display presentation to the user in corresponding situations. Any combination of display, audio, and/or haptic information display attributes may be configured for a particular profile. For instance, when the user leaves her office, second user device 2204 may track her route on foot with a first profile: a high zoom, high granularity, low refresh rate, sponsored or social recommendations set to medium, and voice OFF profile. When the user enters her car, third user device 2206 registers the change with the network (e.g., W4 engine) and switches to second profile: a low zoom, low granularity, high refresh rate, sponsored or social recommendations set to off/low, and voice ON profile. After the user parks, the second user device 2204 operates in the first profile, until the user boards the train. On the train, second user device 2204 switches to a third profile: a low zoom, adjustable granularity, low refresh rate, sponsored and social recommendations high, and voice OFF profile.

The types of information display interfaces could also adjust for each profile. For example, there may not be a need to provide real-time traffic information in the first profile, while the display of traffic information may be very important to provide in the second profile. Train traffic, connecting train links, station congestion, etc., may be provided in the third profile. Likewise, sponsored content could be customized for each profile in order to point out social, topical or temporal points of interest along a route.

Embodiments provide many beneficial features that are described herein. Embodiments enables dynamic, automatically adjusting map displays to be provided, enable integrity and applicability of sponsored content to actual user context, enable map displays to be instrumented based upon rate and mode of motion (if any), and enable the filtering of venues and the changing of zoom and navigational controls automatically.

III. Example Computer Implementations

Figure 23:
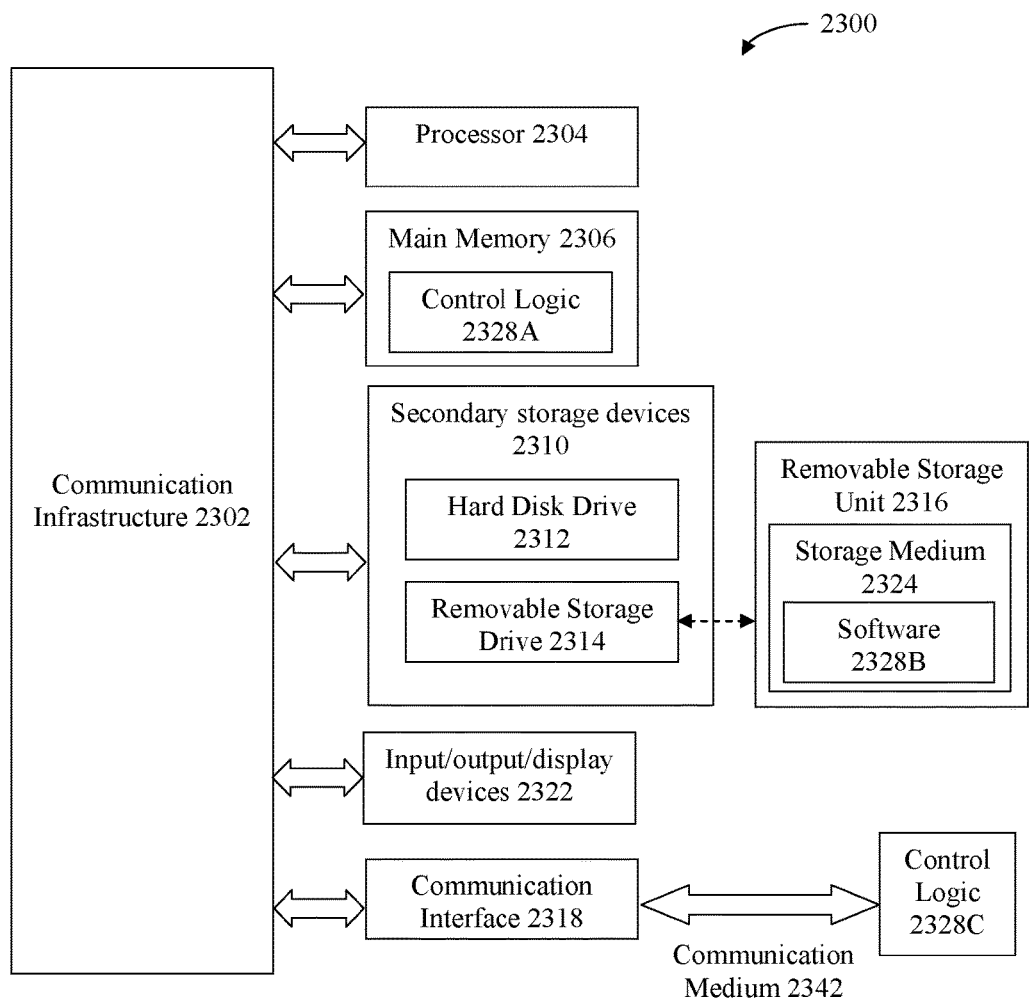
FIG. 23 shows a block diagram of an example computer system in which embodiments of the present invention may be implemented.

The embodiments described herein, including systems, methods/processes, and/or apparatuses, may be implemented using well known servers/computers, such as computer 2300 shown in FIG. 23. For example, routing engine 204, network relationship tracking engine 206, W4 engine 510, W4 engine 702, W4 engine 802, user device 1102, routing engine 1200, and flowchart 1300 can each be implemented using one or more computers 2300.

Computer 2300 can be any commercially available and well known computer capable of performing the functions described herein, such as computers available from International Business Machines, Apple, Sun, HP, Dell, Cray, etc. Computer 2300 may be any type of computer, including a desktop computer, a server, etc.

Computer 2300 includes one or more processors (also called central processing units, or CPUs), such as a processor 2304. Processor 2304 is connected to a communication infrastructure 2302, such as a communication bus. In some embodiments, processor 2304 can simultaneously operate multiple computing threads.

Computer 2300 also includes a primary or main memory 2306, such as random access memory (RAM). Main memory 2306 has stored therein control logic 2328A (computer software), and data.

Computer 2300 also includes one or more secondary storage devices 2310. Secondary storage devices 2310 include, for example, a hard disk drive 2312 and/or a removable storage device or drive 2314, as well as other types of storage devices, such as memory cards and memory sticks. For instance, computer 2300 may include an industry standard interface, such a universal serial bus (USB) interface for interfacing with devices such as a memory stick. Removable storage drive 2314 represents a floppy disk drive, a magnetic tape drive, a compact disk drive, an optical storage device, tape backup, etc.

Removable storage drive 2314 interacts with a removable storage unit 2316. Removable storage unit 2316 includes a computer useable or readable storage medium 2324 having stored therein computer software 2328B (control logic) and/or data. Removable storage unit 2316 represents a floppy disk, magnetic tape, compact disk, DVD, optical storage disk, or any other computer data storage device. Removable storage drive 2314 reads from and/or writes to removable storage unit 2316 in a well known manner.

Computer 2300 also includes input/output/display devices 2322, such as monitors, keyboards, pointing devices, etc.

Computer 2300 further includes a communication or network interface 2318. Communication interface 2318 enables the computer 2300 to communicate with remote devices. For example, communication interface 2318 allows computer 2300 to communicate over communication networks or mediums 2342 (representing a form of a computer useable or readable medium), such as LANs, WANs, the Internet, etc. Network interface 2318 may interface with remote sites or networks via wired or wireless connections.

Control logic 2328C may be transmitted to and from computer 2300 via the communication medium 2342.

Any apparatus or manufacture comprising a computer useable or readable medium having control logic (software) stored therein is referred to herein as a computer program product or program storage device. This includes, but is not limited to, computer 2300, main memory 2306, secondary storage devices 2310, and removable storage unit 2316. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing routing engine 204, network relationship tracking engine 206, W4 engine 510, W4 engine 702, W4 engine 802, user device 1102, routing engine 1200, flowchart 1300 (including any one or more steps of flowchart 1300), and/or further embodiments of the present invention described herein. Embodiments of the invention are directed to computer program products comprising such logic (e.g., in the form of program code or software) stored on any computer useable medium. Such program code, when executed in a processing unit (that includes one or more data processing devices), causes a device to operate as described herein.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
in a routing computing device:
receiving first information from a user device that includes an identification of a user, an indication of a first location of the user and an indication of a destination location;
determining a route as an original route between the first location and the destination location, the destination location being an original destination used in determining the original route;
generating first information display data representative of a first information display that indicates the first location of the user, the destination and the route, the first information display comprising the first information display data that is to be presented in accordance with a manner of presentation specified by a first information display attribute;
providing the first information display data to the user device to enable the first information display to be displayed to the user;
receiving second information from the user device that includes the identification of the user and an indication of a change of location of the user;
receiving information of the user comprising at least one of social data and topical data in response to a user information retrieval request that at least includes the identification of the user, the received information of the user comprising the at least one of the social data and topical data is associated with at least one of the user and the change of location of the user;
modifying the original route to determine a modified route to the original destination based on the change of location of the user and based on the received information of the user comprising the at least one of the social data and topical data;
determining a second information display attribute for displaying a second information display comprising the modified route to the original destination, the determining comprising modifying the first information display attribute based on the change of location of the user and the received information of the user comprising the at least one of the social data and topical data;
generating second information display data, using a computing device, that is representative of a second information display that indicates the change in location of the user, the original destination and the modified route, the second information display comprising the second information display data that is to be presented in accordance with the manner of presentation specified by a second information display attribute; and
providing, in accordance with the determination, the second information display data and the second information display attribute to the user device to enable the second information display comprising the second information display data to be displayed to the user in accordance with the second information display attribute.

2. The method of claim 1, further comprising:
determining a rate of the change of location of the user using temporal data; and
determining the second information display attribute by modifying the first information display attribute based on the determined rate of the change of location and the received information of the user comprising the at least one of the social data and topical data.

3. The method of claim 1, further comprising:
determining a change in a mode of transportation of the user at the second location relative to the first location; and
determining the second information display attribute by modifying the first information display attribute based on the determined change in the mode of transportation and the received information of the user comprising the at least one of the social data and topical data.

4. The method of claim 1, further comprising:
determining a second destination location based on the at least one of the change of location or the received information of the user comprising the at least one of the social data and topical data, and
determining a second route between the first location and the second destination location; and
generating the second information display data comprising:
generating the second information display data representative of the second information display such that the second information display indicates the determined second route in addition to the modified route to the original destination.

5. The method of claim 1, further comprising:
determining a second zoom level specified by the second information display attribute, the determining comprising modifying a first zoom level specified by the first information display attribute based on the change of location and the received information of the user comprising the at least one of the social data and topical data, the first and second information display attributes specifying first and second zoom levels for displaying a map included in both the first and second information displays.

6. The method of claim 1, the first and second information display attributes comprising at least one of a resolution at which a map included in both the first and second information displays is displayed, a navigational control element, or a display space associated with sponsored content.

7. The method of claim 1, the first and second information display attributes comprising at least one of a rate at which an auditory signal included in both the first and second information displays is provided to the user or a volume of the auditory signal.

8. A computer readable non-transitory storage medium for tangibly storing thereon computer readable instructions that when executed cause a processing unit to:
   receive first information from a user device that includes an identification of a user, an indication of a first location of the user and an indication of a destination location;
   determine a route as an original route between the first location and the destination location, the destination location being an original location destination used in determining the original route;
   generate first information display data representative of a first information display that indicates a first location of a user, the destination and the route, the first information display comprising the first information display data that is to be presented in accordance with a manner of presentation specified by a first information display attribute;
   provide the first information display data to the user device to enable the first information display to be displayed to the user;
   receive second information from the user device that includes the identification of the user and an indication of a change of location of the user;
   receive information of the user comprising at least one of social data and topical data in response to a user information retrieval request that at least includes the identification of the user, the received information of the user comprising the at least one of the social data and topical data is associated with at least one of the user and the change of location of the user;
   modifying the original route to determine a modified route to the original destination based on the change of location of the user and based on the received information of the user comprising the at one of the social data and topical data;
   determining a second information display attribute for displaying a second information display comprising the modified route to the original destination, the determining comprising modifying the first information display attribute based on the change of location of the user and the received information of the user comprising the at least one of the social data and topical data;
   generate second information display data representative of a second information display that indicates the change in location of the user, the original destination and the modified route, the second information display comprising the second information display data that is to be presented in accordance with the manner of presentation specified by a second information display attribute; and
   provide, in accordance with the determination, the second information display data and the second information display attribute to the user device to enable the second information display comprising the second information display data to be displayed to the user in accordance with the second information display attribute.

9. The method of claim 1, the social information comprising information indicating a location of at least one acquaintance, of the user, between the current location of the user and the original destination used in determining the original route, modifying the original route to the original destination being based on the change of location of the user and on the social information indicating the location of the at least one acquaintance of the user between the current location of the user and the original destination.

10. The method of claim 1, the topical information comprising information indicating a location, of interest to the user, between the current location of the user and the destination originally used in determining the route, modifying the original route to the original destination being based on the change of location of the user and on the topical information indicating a location, of interest to the user, between the current location of the user and the original destination.

11. The method of claim 1, the received information comprising temporal information indicating an event of interest to the user, modifying the original route to the original destination being based on the temporal information indicating an event of interest to the user.

12. The method of claim 1, the received information of the user used in making the determination to modify the original route to the original destination has an associated weighting that is used in modifying the original route to the original destination.

13. An apparatus comprising:
   at least one computing device, each computing device comprising a processor and a storage medium for tangibly storing thereon program logic for execution by the processor, the stored program logic comprising:
      receiving logic executed by the processor for receiving first information comprising an identification of a user, an indication of a first location of the user and a destination location;
      determining logic executed by the processor for determining a route as an original route between the first location and the destination location, the destination location being an original destination used in determining the original route;
      generating logic executed by the processor for generating a first information display indicating the first location of the user, the destination and the route;
      receiving logic executed by the processor for receiving second information comprising the identification of the user and an indication of a change of location of the user;
      receiving logic executed by the processor for receiving a presentation profile selected from a plurality of presentation profiles associated with the user in response to a request that at least includes the identification of the user, wherein each of the plurality of presentation profiles defines a corresponding information display presentation based on information of the user comprising at least one of social data and topical data associated with at least one of the user and the change in location of the user;
      modifying logic executed by the processor for modifying the original route to determine a modified route to the original destination based on the change of location of the user and based on the received information of the user comprising the at least one of the social data and topical data; and modifying logic executed by the processor for modifying, in accordance with the determination, a first information presentation attribute specifying a manner of presentation of the first information display based on the received presentation profile to obtain the second information presentation attribute, the first information display that indicates the first location, the original destination and the original route to be presented to the user in accordance with the manner of presentation specified by the first presentation attribute and the second information display that indicates the change in location of the user, the original destination and the modified route to be presented to the user in accordance with the manner of presentation specified by the second information presentation attribute.

14. The apparatus of claim 13, the stored program logic further comprising:

determining logic executed by the processor for determining a rate of the change of location of the user using temporal data; and obtaining logic executed by the processor for obtaining the second information presentation attribute by modifying the first information presentation attribute using the determined rate of the change of location and the received information of the user comprising the at least one of the social data and topical data.

15. The apparatus of claim 13, the stored program logic further comprising:

determining logic executed by the processor for determining a change in a mode of transportation of the user at the second location relative to the first location; and obtaining logic executed by the processor for obtaining the second information presentation attribute by modifying the first information presentation attribute using the determined change in the mode of transportation and the received information of the user comprising the at least one of the social data and topical data.

16. The apparatus of claim 13, the stored program logic further comprising:

modifying logic executed by the processor for modifying the determined route for presentation in the second information display using the change of location and using the received information of the user comprising the at least one of the social data and topical data.

17. The apparatus of claim 13, changing logic executed by the processor for changing a zoom level at which a map is displayed in the first and second information displays by modifying the zoom level specified by the first information presentation attribute using at least one of the change of location or the received presentation profile to obtain the zoom level specified by the second information presentation attribute.

18. The apparatus of claim 13, the first and second information presentation attributes comprising at least one of a resolution at which a map included in both the first and second information displays is displayed, a displayed navigational control element, or a display space associated with sponsored content.

19. The apparatus of claim 13, the first and second information presentation attributes comprising at least one of a rate at which an auditory signal included in both the first and second information displays is provided to the user or a volume of the auditory signal.

* * * * *